US 6,497,267 B1

(12) United States Patent
Azar et al.

(10) Patent No.: US 6,497,267 B1
(45) Date of Patent: Dec. 24, 2002

(54) MOTORIZED WINDOW SHADE WITH ULTRAQUIET MOTOR DRIVE AND ESD PROTECTION

(75) Inventors: Tony W. Azar, Allentown, PA (US); Lawrence R. Carmen, Jr., Hellertown, PA (US); Joel Hibshman, Whitehall, PA (US); Jason Killo, Emmaus, PA (US); Michael S. Kokolus, Northampton, PA (US); John Snider, West Chester, PA (US); Gary Will, Macungie, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

(21) Appl. No.: 09/545,427

(22) Filed: Apr. 7, 2000

(51) Int. Cl.[7] .................................................. E06B 9/70
(52) U.S. Cl. ........................ 160/310; 160/188; 242/906
(58) Field of Search ............................ 310/51; 160/310, 160/188; 242/906

(56) References Cited

U.S. PATENT DOCUMENTS

| | | | | |
|---|---|---|---|---|
| 1,978,158 A | * | 10/1934 | Kroenlein | |
| 2,419,159 A | * | 4/1947 | Pezzillo | |
| 3,186,473 A | | 6/1965 | Myers | |
| 3,446,263 A | * | 5/1969 | Roth | |
| 4,347,886 A | * | 9/1982 | Von Knorring | |
| 4,921,371 A | * | 5/1990 | Boiraeu et al. | |
| 5,467,266 A | | 11/1995 | Jacobs et al. | |
| 5,848,634 A | | 12/1998 | Will et al. | |
| 6,082,433 A | * | 7/2000 | Vafaie et al. | |

* cited by examiner

Primary Examiner—Blair M. Johnson
(74) Attorney, Agent, or Firm—Mark E. Rose

(57) ABSTRACT

A motorized shade control system is described in which electrostatic charges, generated by a shade fabric being reeled on to and off of a roller are conducted to and grounded by the shaft of a remote drive motor. The drive motor is ultraquiet, and includes a worm gear drive and single-stage reduction gear assembly which delivers about 0.010 to 0.005 horsepower, with motor output shaft rotational velocity limited to no more than about 30RPM. The motor is mounted within a two-part housing and is clamped between elastomeric acoustic dampers connected between pedestals extending from opposite interior wall surfaces to opposite sides of the motor. An H-bridge drive circuit powers the motor under the control of a microprocessor which can be addressed by an infrared remote transmitter or by a wall mount control. Soft start and soft stop circuits are employed to further reduce noise.

19 Claims, 23 Drawing Sheets

MOTORIZED WINDOW SHADE WITH ULTRAQUIET MOTOR DRIVE AND ESD PROTECTION

FIELD OF THE INVENTION

This application relates to motorized window shades and more specifically relates to an ultraquiet motorized window shade employing a microprocessor controlled motor which is separable from the shade roller and which has electrostatic discharge (ESD) protection for the control circuit.

BACKGROUND OF THE INVENTION

Motorized roller shade assemblies are well known in which a shade can be reeled onto and off of an elongated roller under the control of an electrical motor. Such shades can then be operated remotely to control the amount of light entering a room, to control the temperature and/or air flow in a room, to provide ultraviolet protection, and to provide privacy. The motor may be controlled by a microprocessor. a hand held infrared (IR) remote control, or a remote wall switch to control the direction and speed of rotation of the roller, preset stop positions, and the like. Further, controls driven by time clocks, photo sensors, occupancy sensors and the like can also be used.

One known motor driven shade structure is shown in U.S. Pat. No. 5,467,266, entitled Motor-Operated Window Cover and assigned to the assignee of the present application, the entirety of which is incorporated herein by reference. In that shade structure, the drive motor is located within an upper shade roller. The shade, which accumulates electrical charge (electrostatic charge) during its operation, is connected to earth ground through its roller support through several contact interfaces to a ground terminal to discharge the shade electrostatic charge to earth ground. Thus the microprocessor and other control elements in the control circuit will not be exposed to the high electrostatic potential which could be accumulated on the shade and could damage or destroy the circuits.

Another known prior art structure is a single motorized roller shade made by Somfy of Cluses, France. Its roller is secured to the window opening with two mounting brackets. The single roller shade is custom made with a fabric of choice. The motor is installed inside the roller tube at the factory and line or low voltage wiring connects the motor to a nearby power source. The roller shade is driven by an AC motor and does not include a microcontroller and is therefore less affected by ESD, other than the discomfort a user may experience due to electrostatic discharge when the shade is touched.

Motorized roller shades are also made, using an external motor drive which is separable from the shade roller. These have the advantage of easier shade replacement and maintenance since the roller can be easily separated from the external drive motor. A system of this kind is shown in U.S. Pat. No. 5,848,634, which is assigned to the assignee of the present application, and the entirety of which is incorporated herein by reference. Since the motor is removable from the roller, noise reduction techniques are more easily applied to the motor and its support structure. However, the physical removal of the motor from the roller complicates the discharge of the electrostatic charge on the shade to prevent its accidental connection to voltage-sensitive components in the motor control circuits.

The system of the U.S. Pat. No. 5,848,634 patent has shade fabric coupled to a single roller driven by an external motor drive unit. The motor drive unit is enclosed in a housing which supports a first end of the roller shade. The second end of the roller shade is supported by an idler bracket. The fabric is reeled or unreeled onto the roller to display a certain amount of shade fabric in front of a window or other opening. The motor drive unit is controlled by a microprocessor to allow for the setting of upper and lower limits and various preset and stop positions. The presets can be selected at a wall control to display a predetermined amount of shade fabric. The motor drive unit is connected to a low voltage transformer, usually 24VAC, which can be connected to a nearby power source. However, the motor drive unit does not have a ground terminal. Therefore, accumulated electrical charge on the shade can be accidentally connected to voltage-sensitive motor control components and damage or destroy them. Further. the drive motor can produce excessive noise, or noise of an especially annoying quality.

In the field of lighting controls, it is also known to use electrically conductive tapes to protect sensitive electrical components from ESD damage. For example, the Grafik Eye® 3000 Series of lighting controls, manufactured by the assignee of the present application, can be adversely affected if static electrical charge is not properly directed away from the sensitive control components, particularly high-impedance circuits such as the gate circuit of MOSFET transistors in the control circuits. Thus, during the manufacturing process, conductive tape is placed on the back side of the lighting control faceplate near all openings or entry points for ESD. The conductive tape is then coupled to the lighting control yoke, usually made from an aluminum alloy, which can be coupled to earth ground. This creates a low resistance path between the source of electric charge and ground. If such a controlled, low resistance path is not provided, the electrical charge may travel from the source to ground through a sensitive component causing damage to the component.

Thus, it is desirable to provide a novel arrangement for a motor controlled shade which will reduce motor noise, improve ESD protection and preferably, a combination of both of these features.

SUMMARY OF THE INVENTION

In accordance with a first feature of the invention, a novel roller shade assembly is made, which may use a remote motor drive unit; that is, one in which the roller and shade are removably mounted relative to the drive shaft of a fixed motor drive unit, wherein a novel structure is provided for connecting the roller to the motor drive unit output shaft, and thus to a remote ground. Further, the motor drive unit, which is physically removed from the interior of the roller, is now mounted and operated in a manner to greatly reduce motor noise.

More particularly, the motor drive unit, which acts as a fixed support for one end of the roller, includes a motor and worm gear drive assembly supported within the interior surface of a two-part housing by rubber or elastomeric motor drive isolation grommets. Further, the motor armature rotational velocity is operated at a predetermined operating speed of about 1600 RPM (corresponding to a roller speed of about 22 RPM), but not greater than about 2200 RPM (corresponding to a roller speed of about 30 RPM). Still further, soft start and soft stop control is exercised on the motor to prevent noise generation due to start and stop play in the motor drive system.

DETAILED DESCRIPTION OF THE INVENTION

Figure 1:
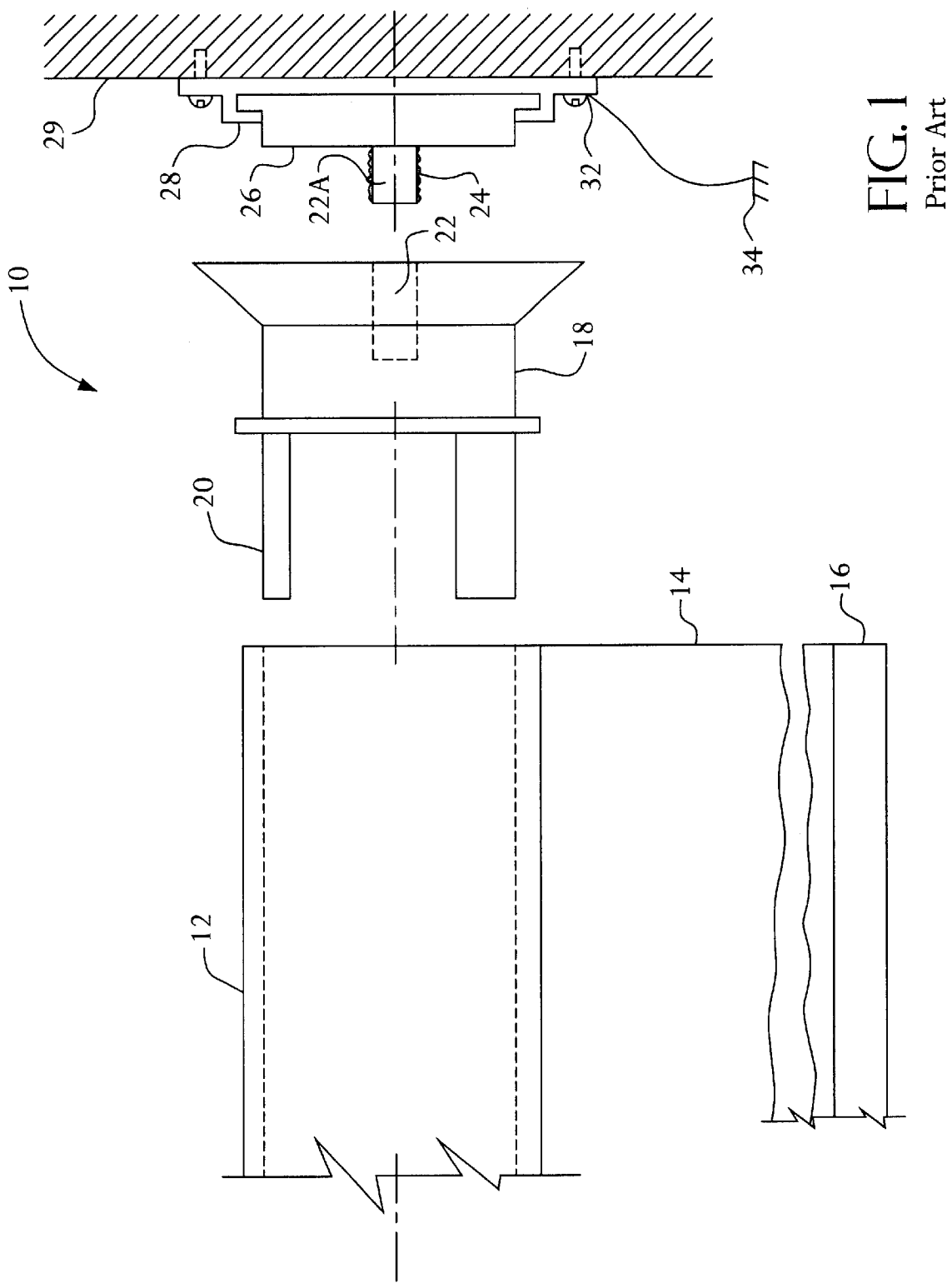
FIG. 1 is a front view, partially in section, of a prior art motor driven window shade assembly with the motor built into the interior of the roller.

The foregoing summary, as well as the following detailed description of the preferred embodiments is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Referring first to FIG. 1, there is shown a portion of a prior art motor driven shade and, in particular, an idler end of a roller shade assembly 10 driven by an internal motor at the other end of the roller (not shown). A shade fabric 14 is coupled to a roller 12 using tape, staples, or screws. Roller 12 is a hollow elongated aluminum cylinder with several internal protrusions (not shown). The roller 12 is rotated by a coupled drive motor (located within the roller, as shown in U.S. Pat. No. 5,467,266) to reel and unreel the shade fabric 14 from the roller 12. A hem bar 16 located at the bottom of the shade fabric 14 provides a weight to keep the shade fabric 14 taut.

To provide an ESD discharge path to discharge accumulated static charge on shade 14, molded end cap 18 is painted with an electrically conductive paint and then inserted into the end of conductive roller 12. This painting process is difficult, time consuming, and costly. The end cap 18 has a counterbore 22 formed in its end. Flexible fingers 20 of the end cap 18 grip the internal protrusions (not shown) on the inside of the roller 12. A protrusion 22A formed as part of an idler roller support 26 is inserted in the counterbore 22 to support one end of the roller 12. The idler 26 is painted with the same electrically conductive paint as the end cap 18, and idler protrusion 22A is also coated with an electrically conductive grease 24. The idler 26 is secured by a metal idler bracket 28 which is secured to a wall surface 30 with screws or bolts or in any other manner. A ground terminal 32 is provided on the idler bracket 28 for connection to a suitable earth ground 34.

Any charge that is developed on the shade fabric 14 as it is reeled and unreeled from the roller 12 is directed to earth ground 34. Thus, developed charge from the shade fabric 14 is discharged through the path of the electrically conductive roller 12 to the end cap 18, and then through the path of the electrically conductive grease 24 to the electrically conductive idler 26 and then to the grounded idler bracket 28. One disadvantage of the prior art electrostatic discharge protection system is that it requires electrical connections be made to the idler bracket in addition to those required for the motor, thus increasing the cost of the system, and increasing the complexity of installation.

Figure 2:
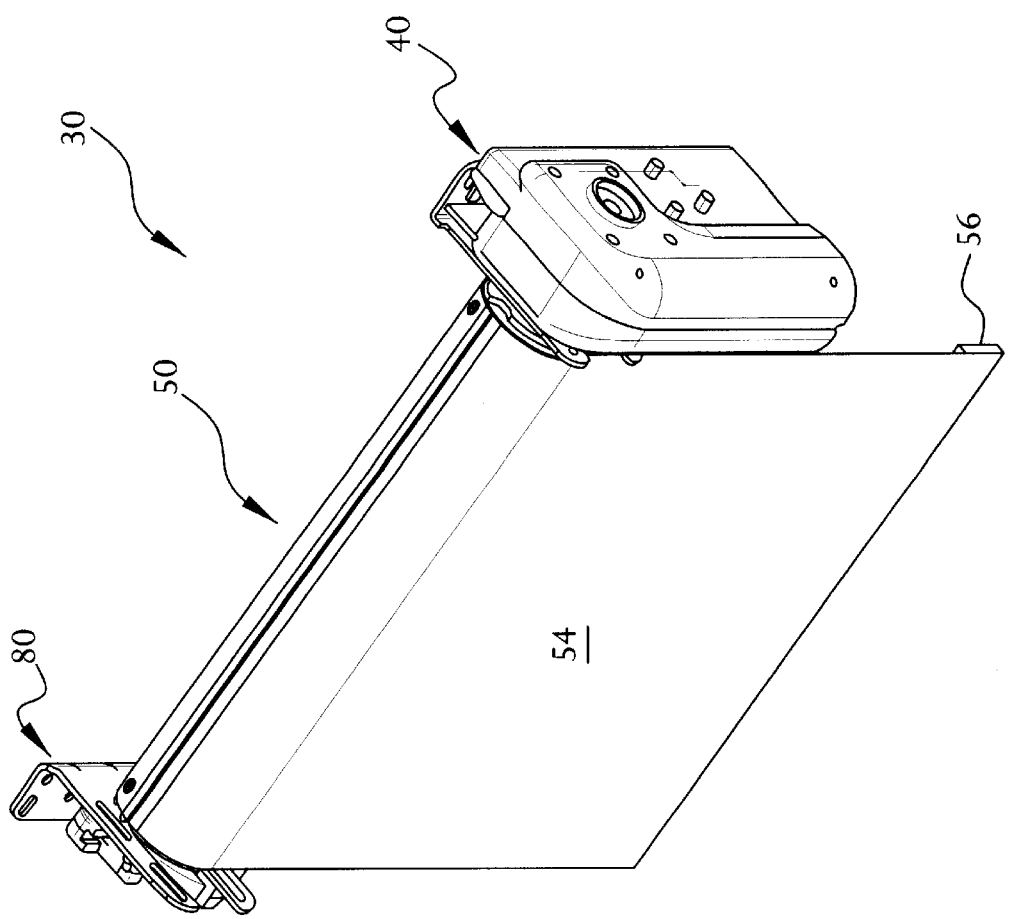
FIG. 2 is an isometric view of a motorized window shade assembly according to the present invention with the motor drive unit positioned exteriorly of the shade roller.

Referring next to FIG. 2, there is shown a motor shade assembly 30 made in accordance with the invention. Assembly 30 comprises a roller shade assembly 50, a motor drive unit 40, and an idler bracket 80. The assembly can be mounted adjacent to a window opening, or to a flat vertical wall or, in general, to any building or other structure. The assembly can also be disposed in a horizontal plane; for example, underneath an overhead skylight. It can also be disposed at an angle to horizontal or vertical. A single assembly is shown, but multiple assemblies 30 can be mounted side-by-side, for example over a corresponding group of adjacent windows. As will be later described, the motor drive unit 40 rotates the roller shade 50 to reel or unreel shade fabric 54 from the roller. A weighted hem bar 56 is provided to keep the shade taut.

The motor drive unit 40 receives control signals from any suitable source such as an infrared remote control or a low-voltage wall control as will be later described. The motor drive unit 40 is powered from a conventional 120 volt ac wall receptacle through a 120:24 transformer (not shown). This combination of easy-to-install low-voltage control wiring and plug-power wiring allows for installation by the typical end user without the necessity of using an electrical contractor. Alternatively, the motor drive unit 40 could be hardwired to a building distribution panel.

Figure 3:
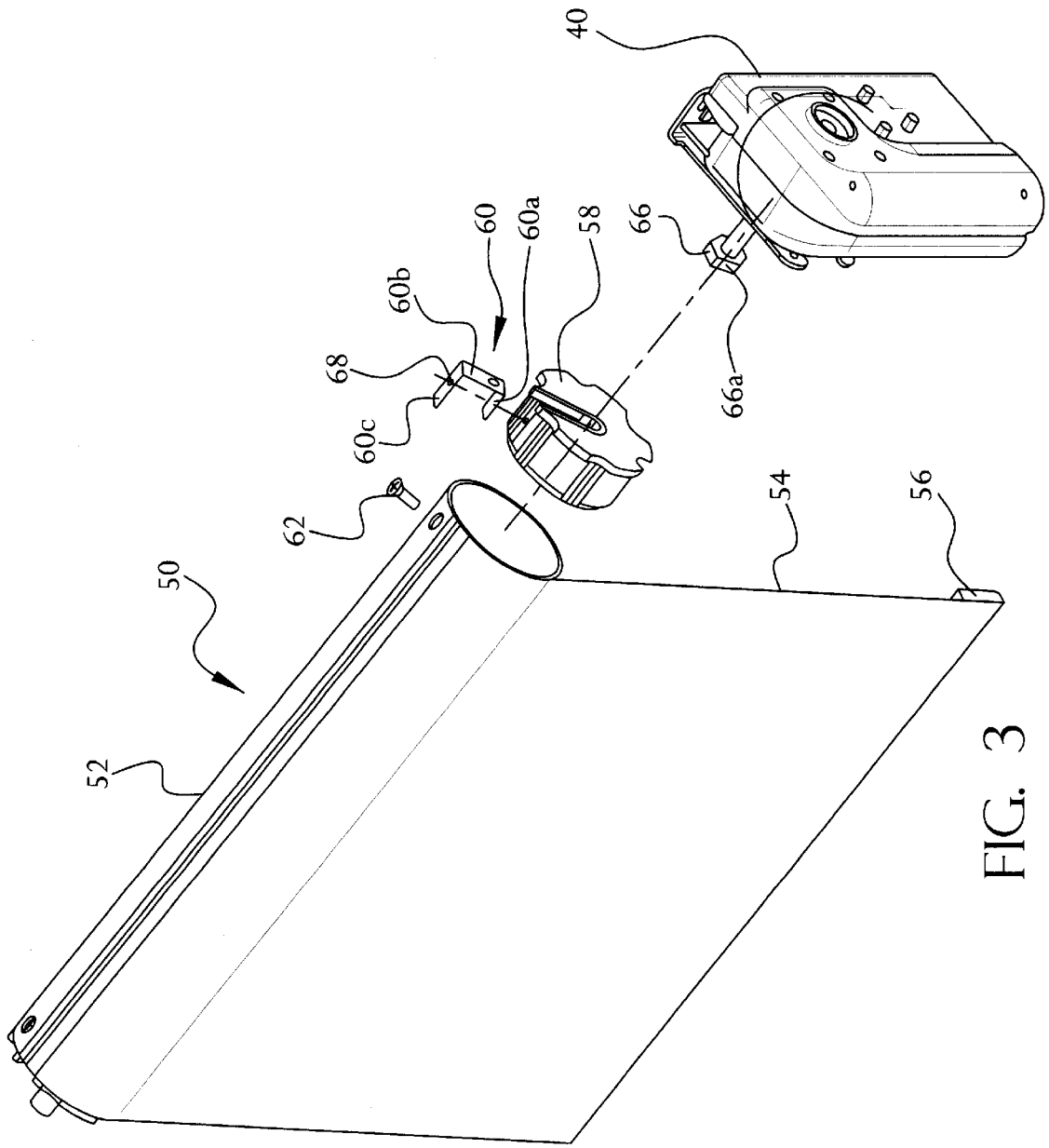
FIG. 3 is an isometric view of a portion of FIG. 2, illustrating the novel ground strap connection between the roller and the motor drive output shaft.

Referring to FIG. 3, the roller shade assembly 50 includes a roller 52 which is cut to an appropriate length depending on the window opening. In the preferred embodiment, the roller is a section of 2 inch to 2.2 inch diameter aluminum alloy tubing. The roller 52 may be made from any material that is capable of conducting electrical charges, and which is sufficiently rigid to support the weight of a shade fabric 54, such as, without limitation, aluminum, steel, or carbon composite. Alternatively, the roller 52 may comprise a non-conductive material faced with a conducting material, such conductive tape, a metal mesh or foil, or a spiral wound conductor. The shade fabric 54 is secured to the roller 52 with tape, staples, or screws or the like. A weighted hem bar 56 is provided in fabric 54. Secured in the first end of the roller 52 adjacent the motor drive 40 is a first end cap 58. The end cap 58 may be plastic, molded, for example, from DELRIN 500P (a registered trademark of E.I. Du Pont De Nemours and Co.).

The end cap 58 is designed to fit securely in the roller 52 with a press fit. Details of the end cap 58 are shown in FIG.

4. A screw 62 (FIG. 3) can be inserted through a hole in the roller 52 and threaded into the end cap 58. This prevents the roller 52 and the end cap 58 from rotating relative to each other.

In accordance with one embodiment of the invention, an electrically conductive strap 60 is used to couple the roller 52 to a motor drive shaft 66 (FIG. 3) of the motor drive unit 40. The electrical conductor 60 (FIGS. 3 and 4) may be a preformed piece of metal such as 0.008 inch 300 series stainless steel. The strap 60 also has a hole 68 to receive a screw 62. The screw 62 therefore electrically couples the roller 52 to the strap 60 and also mechanically connects the roller 52 to the end cap 58. The electrical conductor 60 could, however, electrically couple roller 52 and shaft 66 without the screw 62. An alternative to using the screw 62 and the press fit structure to prevent rotation of the end cap 58 in relationship to the roller 52 is to extrude a roller with several internal protrusions and mold an end cap with corresponding intrusions.

Figure 4:
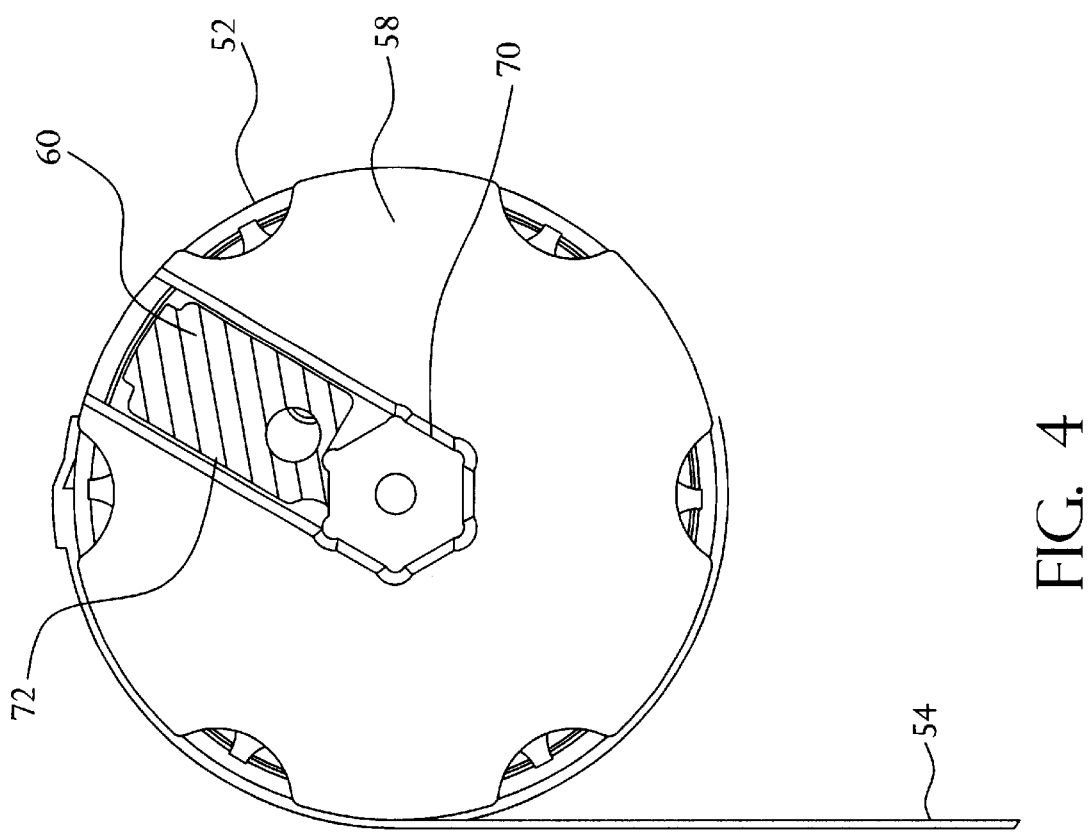
FIG. 4 is an end view of the roller end cap of FIG. 3.

End cap 58 is shown in FIG. 4 with a hexagonal opening 70. This opening receives the hexagonally-shaped motor drive shaft head 66A ("hexball") of drive shaft 66. A first end of the electrical conductor 60 is inserted in slot 72 in cap 58. When the motor drive shaft 66 is inserted in opening 70, the bottom leg 60A (FIG. 3) of electrical conductor 60 is pressed against motor drive shaft 66 thereby to electrically connect the roller 52 and its shade 54 to the motor drive shaft 66 with a pressing action. The middle section 60B of the electrical conductor 60 sits in slot 72. The upper end 60C of the electrical conductor 60 is trapped between the outside surface of the end cap 58 and the inside surface of the roller 52. The top and bottom legs 60A, 60C of the electrical conductor 60 are preferably formed so as to be biased outwardly so as to ensure good electrical connection with the roller 52 and the shaft 66. Alternative arrangements of the electrical conductor are possible without departing from the scope of the invention.

Figure 5:
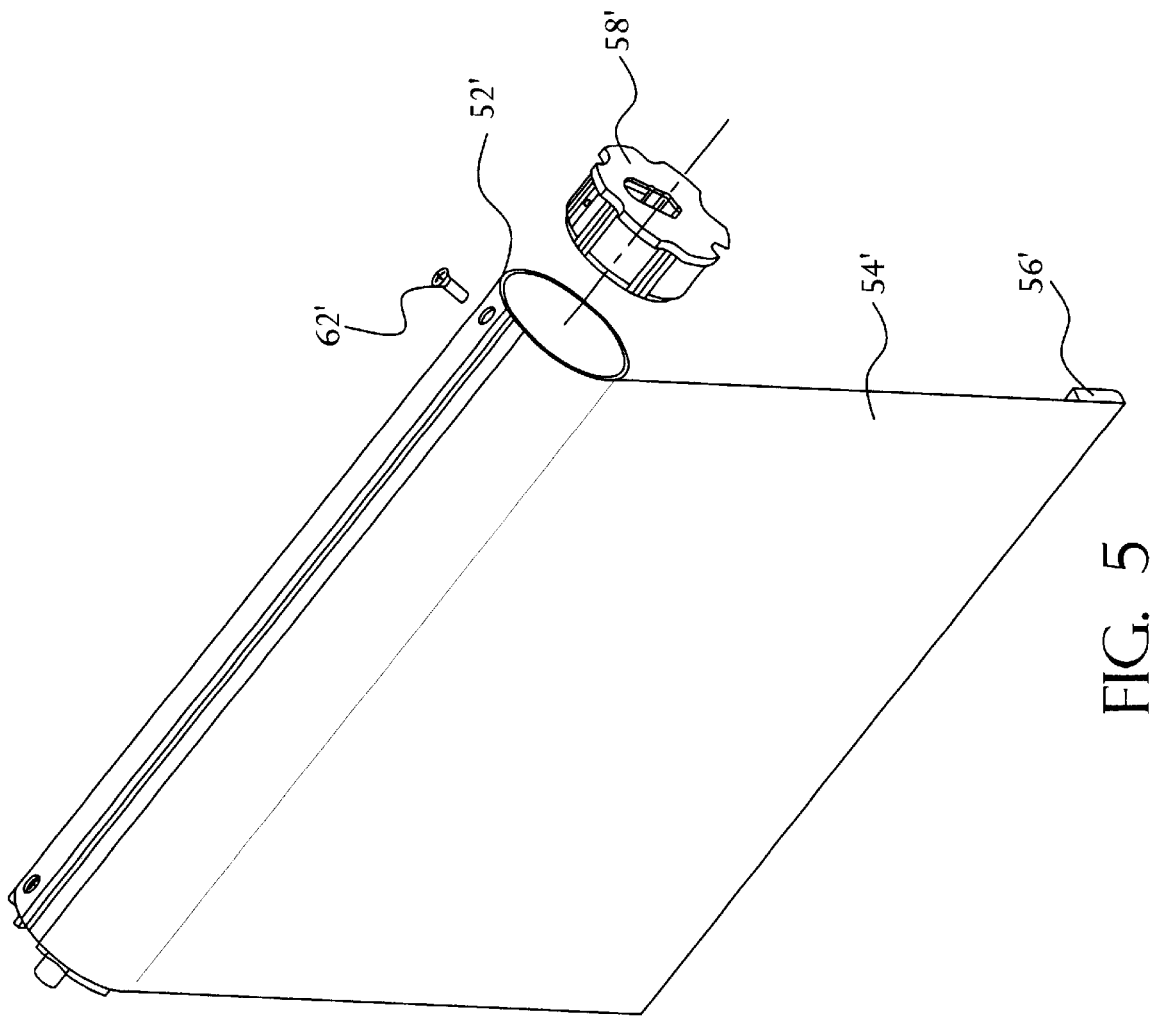
FIG. 5 is a view similar to that of FIG. 3, of a second embodiment of he ground connection circuit.

FIG. 5 shows a second, preferred embodiment of a manner of connecting roller 52' to the motor shaft (not shown). Roller 52' is thus coupled to an end cap 58'. The end cap 58', however, unlike cap 58 of FIG. 4, is molded from a suitable electrically conductive material. In one embodiment, for example, carbon fiber in a sufficient quantity is added to nylon prior to a molding process so that the so molded end cap 58' is electrically conductive. The electrical charge on the shade fabric is then coupled from the roller 52' to the motor drive shaft 66 through the electrically conductive end cap 58'. Other conductive materials may be added to other types of plastics. Of course, the end cap 58' may be made of other electrically conductive materials such as metals.

Figure 6:
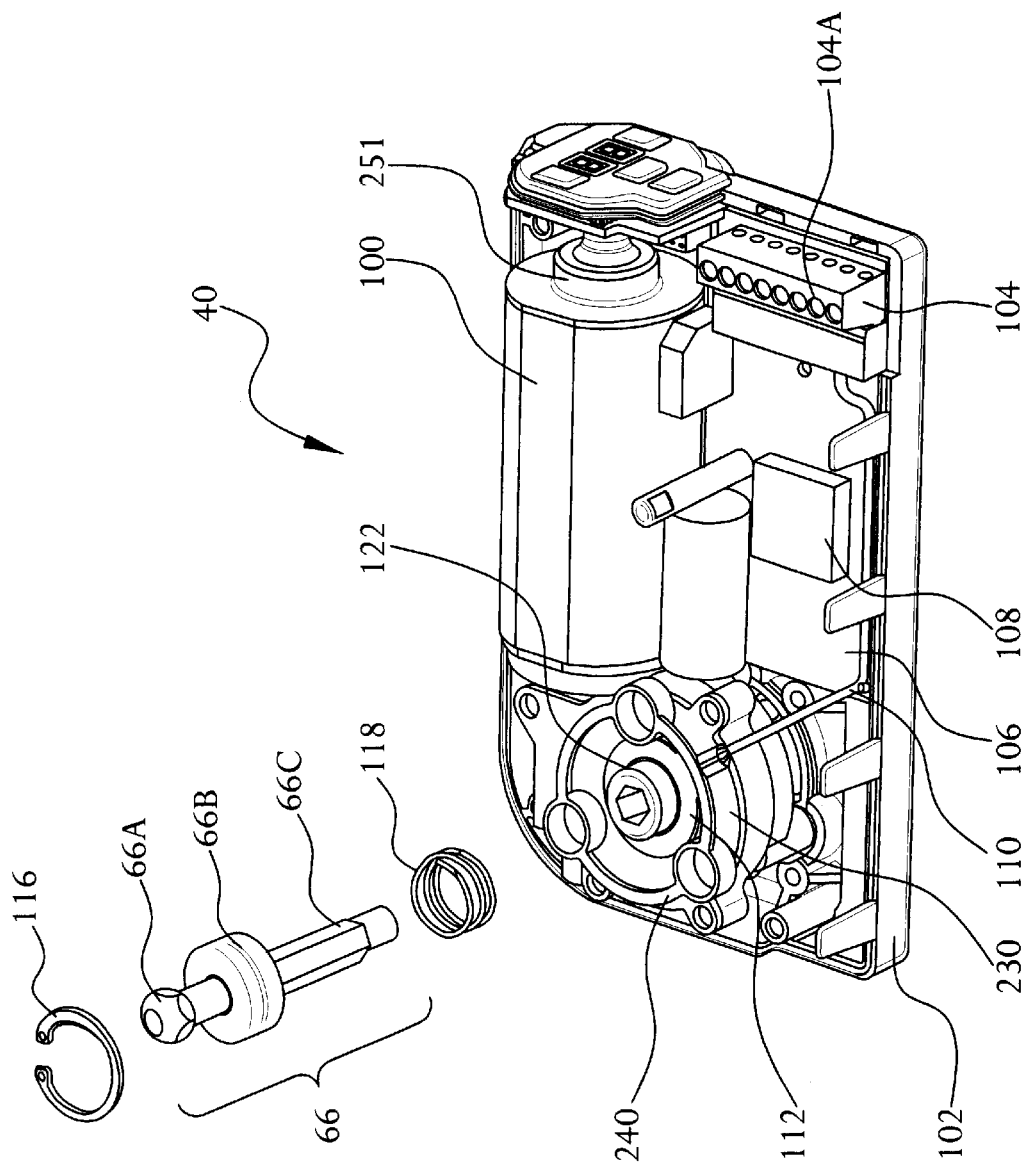
FIG. 6 is an exploded perspective view of the motor drive unit of FIG. 2.

FIGS. 6 to 9 show the structure of the motor drive unit 40 of the invention. Thus, FIG. 6 shows an exploded view of the motor drive unit 40 of FIG. 2 with the top half 220 of the housing removed. The housing is designed to cradle a motor assembly 100/230 and a printed circuit board 106. The motor assembly 100/230 is available as an integral unit from Valeo of Stuttgart, Germany. The printed circuit board 106 includes a microcontroller 108 (which is sensitive to ESD) and a connector 104. The motor assembly 100/230 includes a worm gear drive motor 100, and a single-stage reduction gear assembly 230 having an output drive socket 122 made from a nonconductive plastic, such as nylon, which receives the drive shaft 66.

In order to electrically couple the output drive shaft 66 to a ground terminal 104A located in connector 104, a spring 118, a lug 112, and a wire 110 are used as best shown in FIG. 6. The output drive shaft 66 comprises the hexball 66A, a bushing 66B, and a hex shaft 66C. When the output drive shaft 66 is inserted in the motor output drive socket 122 and secured in the housing 220 with the retainer clip 116, the spring 118 electrically couples the bushing 66B of output drive shaft 66 to washer 112 which is crimped to a first end of the wire 110. The other end of the wire 110 is coupled to the ground terminal 104A in the connector 104. This provides a reliable low resistance path for conducting electrostatic charge on shade 54 from the shade roller, to the output drive shaft 66, and to the ground terminal 104A via conductor 110.

Figure 7:
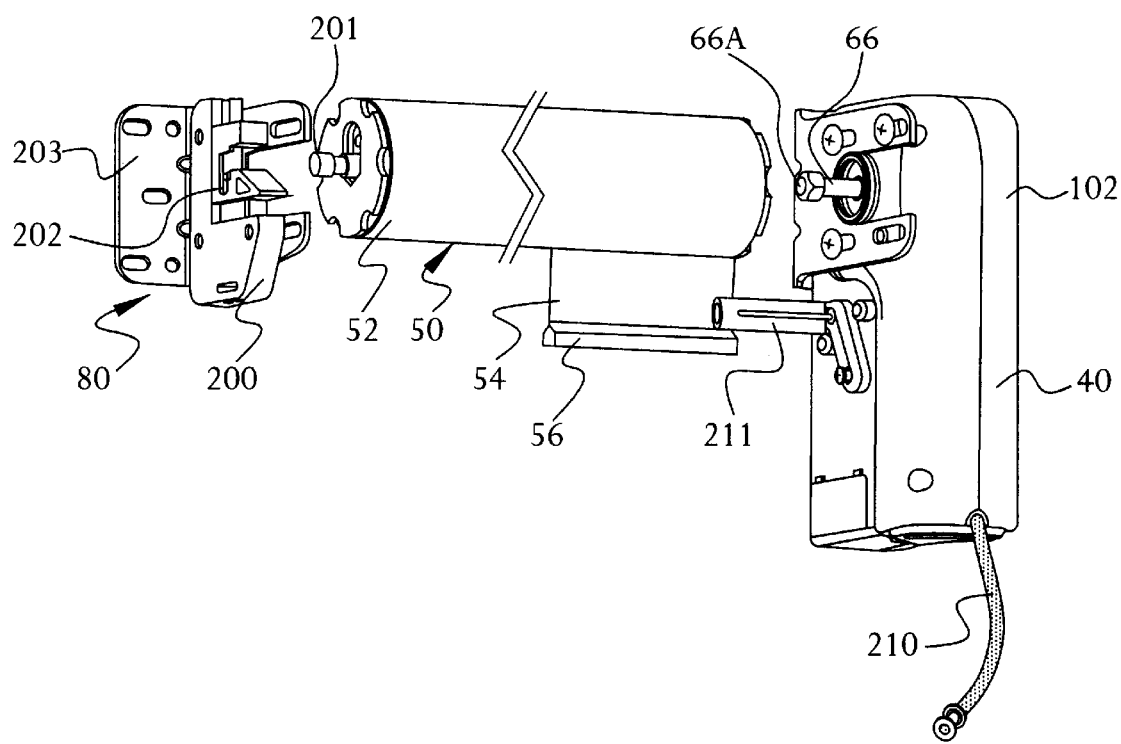
FIG. 7 is an exploded perspective view of the novel assembly of motor drive unit, shade roller and idler bracket of the invention.
Figure 8:
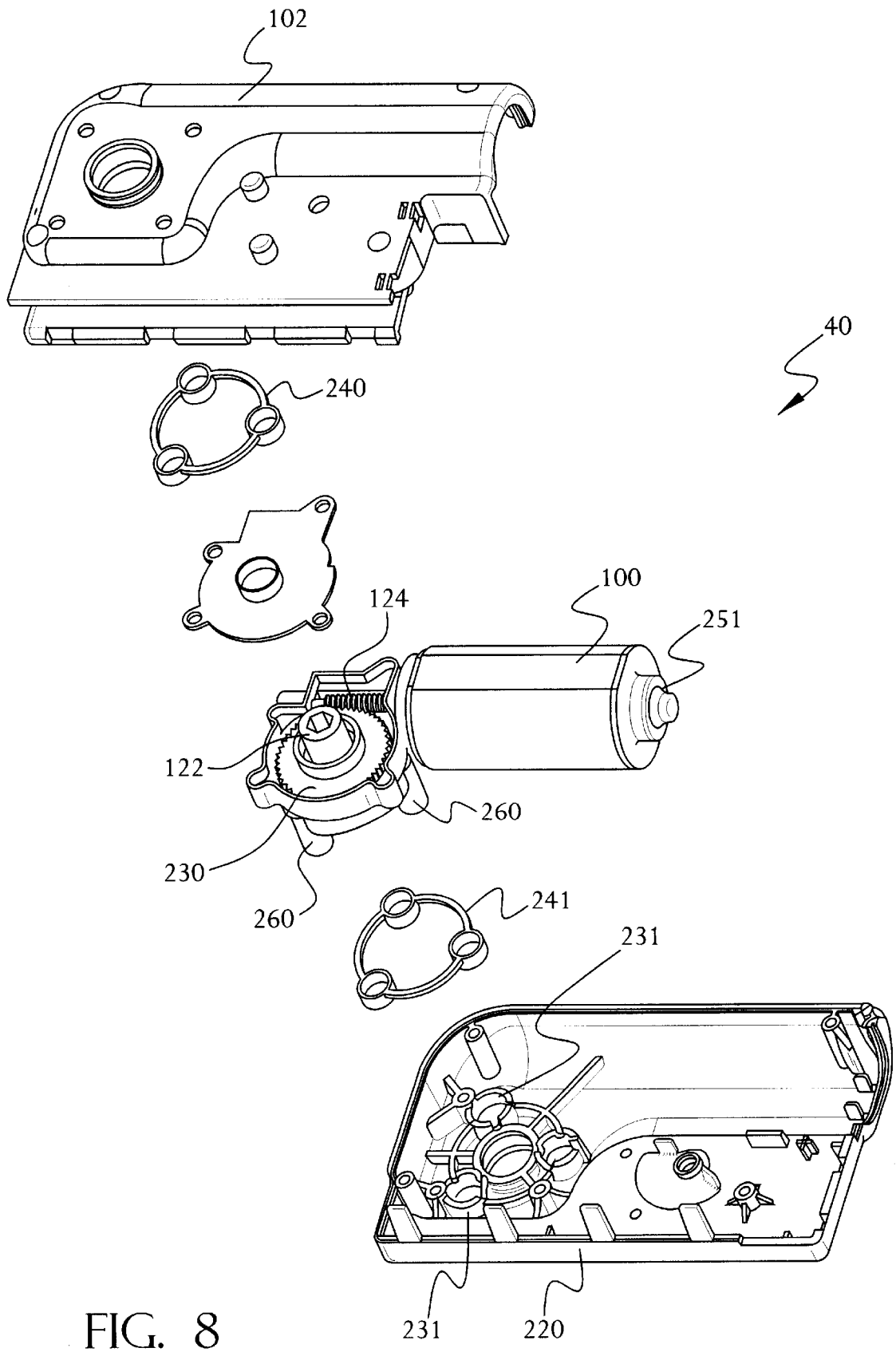
FIG. 8 is an exploded perspective view of the motor drive unit of FIG. 6, further showing the interior of a first housing half.

FIGS. 6, 7 and 8 show further details of the novel motor drive structure and assembly. Thus, FIG. 7 shows the manner in which the roller 52 and its shade 54 extend between the motor drive unit 40 (and drive shaft 66) and the idler support 200 which is arranged to slidably receive idler pin 201 fixed to the left hand end of roller 52 in slot 202 and to lock the pin 201 against accidental release. Idler support 200 is provided with a mounting bracket 203 which can be easily fixed to a support surface. Housing 102, 220 is also fitted with openings to enable its screw or bolt connection to a support surface.

Figure 9:
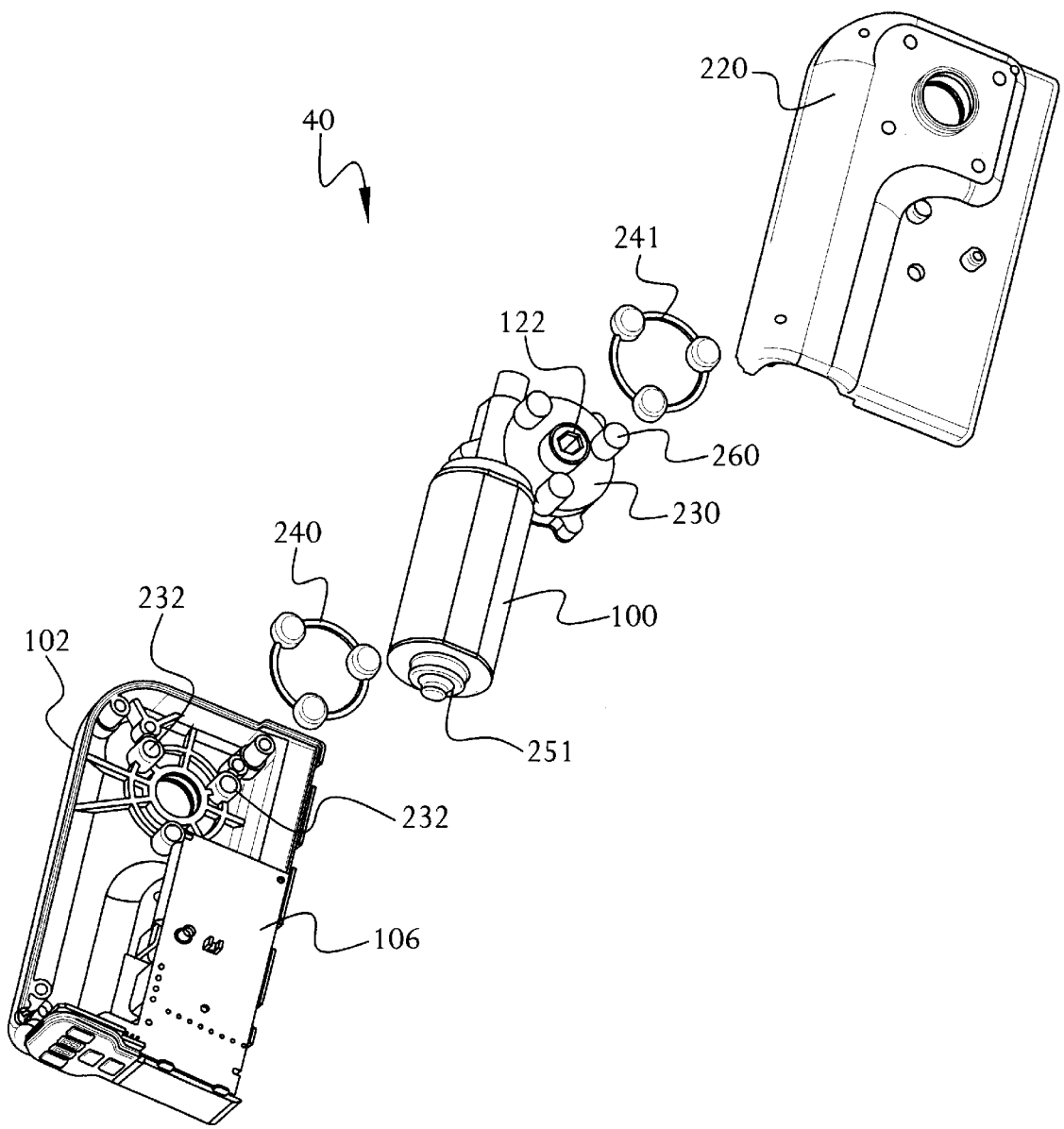
FIG. 9 is an exploded perspective view of the motor drive unit of FIG. 8 showing the interior surface of the opposite housing half.

The motor drive unit 40 of FIGS. 7, 8 and 9 in a preferred embodiment, uses a 24VAC power supply (50VA or 100VA). The motor drive can be controlled via a hand held infrared transmitter or by wall mounted keypads.

The shade 54 can be any desired fabric with the motor drive 40 being capable of handling a fabric size up to about 3.3 meters by 3.3 meters with a maximum fabric weight per motor of about 4.5 kilograms. Of course, larger fabric sizes may be accommodated by means of a motor drive unit capable of generating more torque.

The motor drive unit 40 can be controlled by a programmed control having options which include upper and lower limits of shade travel; room address; control station set up; and a communications cable for operating a multi-shade system.

The motor drive unit 40 has an infrared (IR) receiver port, which, in FIG. 7, is shown as containing an IR light pipe 210 which extends the infrared input location to the motor drive unit 40 when direct line-of-sight to the IR receiver port is obstructed by a valence, fascia or curtain top treatment or the like.

Also shown in FIG. 7 is a "home position" lever 211. Lever 211 sets a shade home position when triggered by the bottom weight bar, or hem bar 56, being drawn upwardly. When the lever 211 is actuated during normal operation, the shade 54 will drop to the default, or user programmed, upper limit.

Referring next to FIGS. 8 and 9, further details are shown for the construction of the motor drive unit 40. Thus, the housing consists of an upper housing half 220, shown in FIG. 6, and a lower half 102 which is mated with the upper half 220, and then fastened by screws or the like. Alternatively, the housing halves may be secured together by means of a snap fit.

Motor 100 has a worm gear output shaft 124 which drives an integral gear reduction assembly 230. The motor assembly 100/230 is then mounted within the housing halves 102, 220 by clamping between and against integral pedestals 231 extending from the interior surface of housing half 220 (FIG. 8) and opposing pedestals 232 extending from the interior surface of housing half 102 (FIG. 9). To improve quiet operation of the motor, integral rubber or elastomeric motor grommets 240 and 241 (acoustic dampers) are interposed between pedestals 231 and assembly 230, and between pedestals 232 and assembly 230, respectively.

As will be further described later, and to further ensure quiet window shade operation, the motor armature rotational velocity is kept below a predetermined speed, preferably about 2160 RPM (corresponding to an output drive shaft rotational velocity of about 30 RPM), and is preferably operated at a steady rate of about 1584 RPM (corresponding to an output drive shaft rotational velocity of about 22 RPM), when reeling the shade up and down. The motor armature or rotor speed is determined to be that speed which minimizes offensive noise emission while optimizing motor torque and keeping the shade linear speed acceptably fast. The armature or rotor speed limit will vary with specific motor designs. It is especially important with smaller motors to be able to rotate the armature as fast as possible for efficiency reasons, while keeping the armature speed slow enough to minimize noise emission.

The quiet operation of the motor drive unit is next described. It will be apparent that quiet operation is highly desirable for such apparatus used in home and office applications. Prior motor operated window shade apparatus have had a significant drawback of noisy operation. A number of features are employed, in combination, in the novel structure of the invention which substantially reduce motor noise while raising and lowering the shade.

A first feature for quiet operation is the use of the worm gear drive. The worm drive is inherently quieter than other motors, but is less efficient. Such worm gear motors have been used for motor drive shades, as shown in U.S. Pat. No. 4,238,969 dated Dec. 16, 1980 to Krause. The specific motor of the invention, however, differs from that of U.S. Pat. No. 4,238,969. Thus, motor assembly 100/230 is a self-contained unit with an integral end cap 251 (FIGS. 6 and 9) which contains a Hall effect sensor 250 (to sense motor position, and hence, roller and shade position) and filter circuitry. Further, the motor armature windings and reduction gear ratio (72:1) have been chosen to optimize the motor torque, efficiency and performance over the lifetime of the motor. The efficiency of the motor is about five to ten percent so that the motor, rated at about one-tenth horsepower, produces only about five- to ten-thousandths horsepower of mechanical output drive to the roller shade.

Moreover, the motor assembly 100/230 employs only a single stage of gear reduction in the reduction gear assembly 230. This further reduces noise generated by the meshing of gear teeth.

A second feature of the combination of the invention lies in the use of acoustic dampers 240 and 241 with the worm drive motor. Thus, identical acoustic dampers 240 and 241 are located on opposite sides of the motor assembly 100/230, each formed as a set of three equally circumferentially spaced cups connected together by a thin ring of the same material. The cups are spaced so as to align with and to fit over three corresponding legs or protrusions 260 (FIGS. 8 and 9) that extend from one side of motor assembly 100 and the corresponding legs 231, 232 which extend from the interior surfaces of housing halves 220, 102. Thus the motor assembly 100/230 is mounted to the housing through the acoustic dampers 240, 241.

The acoustic dampers 240, 241 are interchangeable and are made of a thermoplastic material designed for acoustic damping, such as Versa Damp 2000 TPE System, sold by Cabot Safety Intermediate Corporation of Newark, Delaware. These acoustic dampers 240, 241 have a Shore A durometer value of 70 (ASTMD 2240@ 5 seconds). The dampers 240, 241 are also temperature stable up to 100° C. continuous and 125° C. intermittent.

In addition to providing acoustic or vibration isolation between the motor assembly 100/230 and housing 102, 220, the mounts 240, 241 (which are compressed when the housing halves 102, 220 are connected together) also prevent or retard rotation of the motor 100/230 relative to the housing 240, 241. Note that the acoustic dampers 240, 241 can be separate elements, but the connecting ring is desirable for ease of assembly. The acoustic dampers also provide a self-aligning feature that allows the motor assembly 100/230 to "float" slightly to allow the output drive socket 122 to easily align with the hex shaft 66. This has the beneficial effect of reducing gear wear and noise due to misaligned parts.

A third aspect of the novel combination involves the limitation of motor armature rotational speed. Thus, motor speed is normally limited to about 1584 RPM, but may run as fast as 2160 RPM. If the motor is run faster, the acoustic output increases to levels unacceptable to typical consumers. Further, as the motor speed increases, power consumption also increases. The preferred "standard" speed of about 1584 RPM ensures that the linear speed of the shade 54 is acceptably fast for the typical user, without generating excessive noise. Thus, with the present invention, a 3.5 meter long shade will take no more than about 50 seconds to move between fully open and fully closed positions. While motor speed is programmable during set up, the end user will not ordinarily program the motor speed. Limiting motor speed to no more than about 2160 RPM, in combination with the worm gear drive and acoustic dampers, has been found to limit acoustic emission from the motorized window shade to an acceptable level.

A final significant contribution to reduction of noise is in the electrical control of the motor and the related software. More specifically, the motor is driven with a pulse width modulation (PWM) mode, with a PWM signal that is out of the range of human hearing (about 20 kHz). Further, the starting and stopping of the motor employs a "soft" start and "soft" stop function which gradually ramps the motor speed up and down when transitioning between rest and steady-state motion. This reduces noise which may be otherwise generated due to taking up play in the drive system. A control loop is also used to regulate motor speed and to minimize fluctuations in motor speed that would cause annoying audible sound (such as a "hunting" sound of a motor struggling with a load) to the occupant of a room.

Figure 10A:
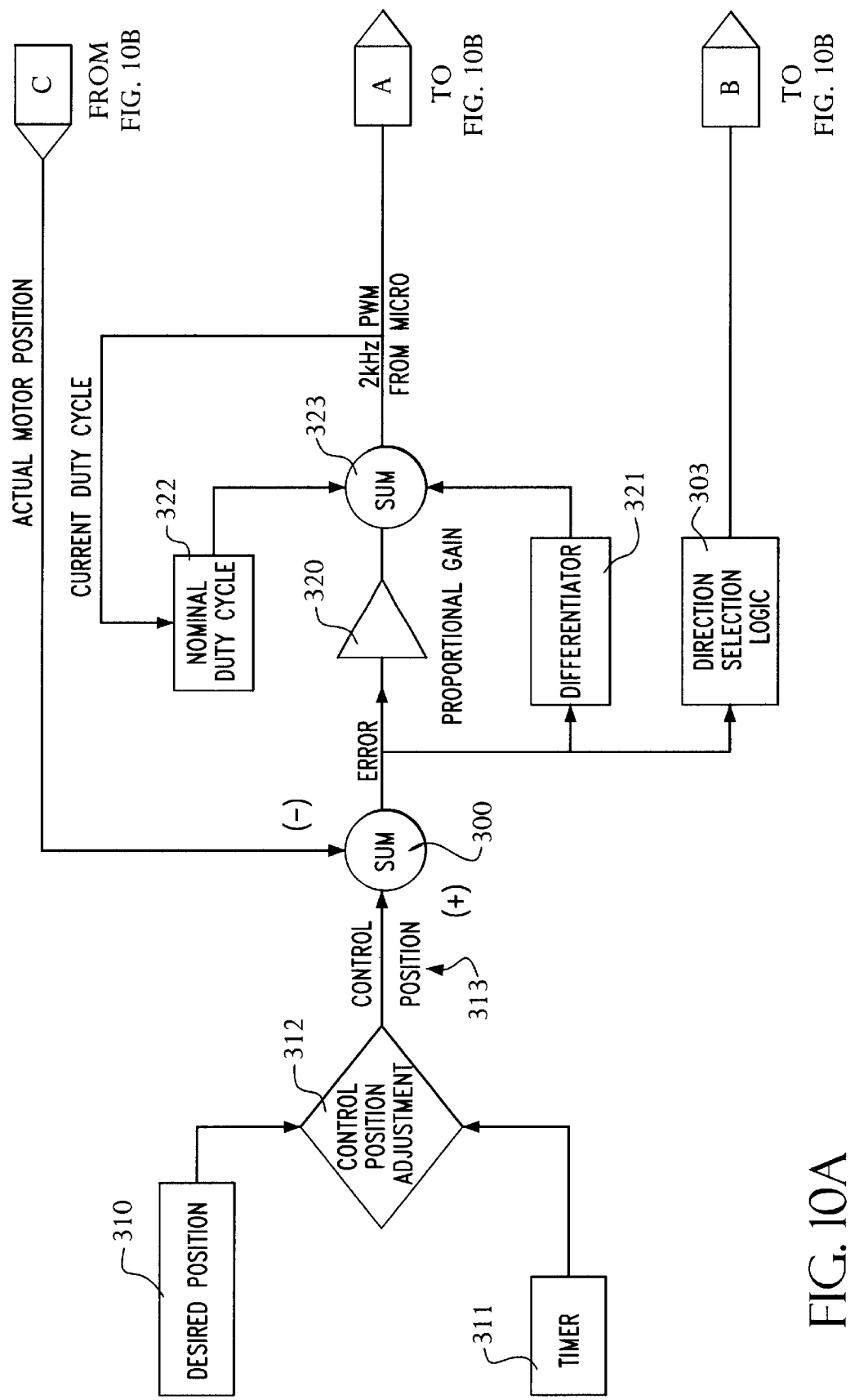
FIGS. 10A and 10C are interrelated sections of a block diagram of the control circuit for the drive motor.
Figure 10B:
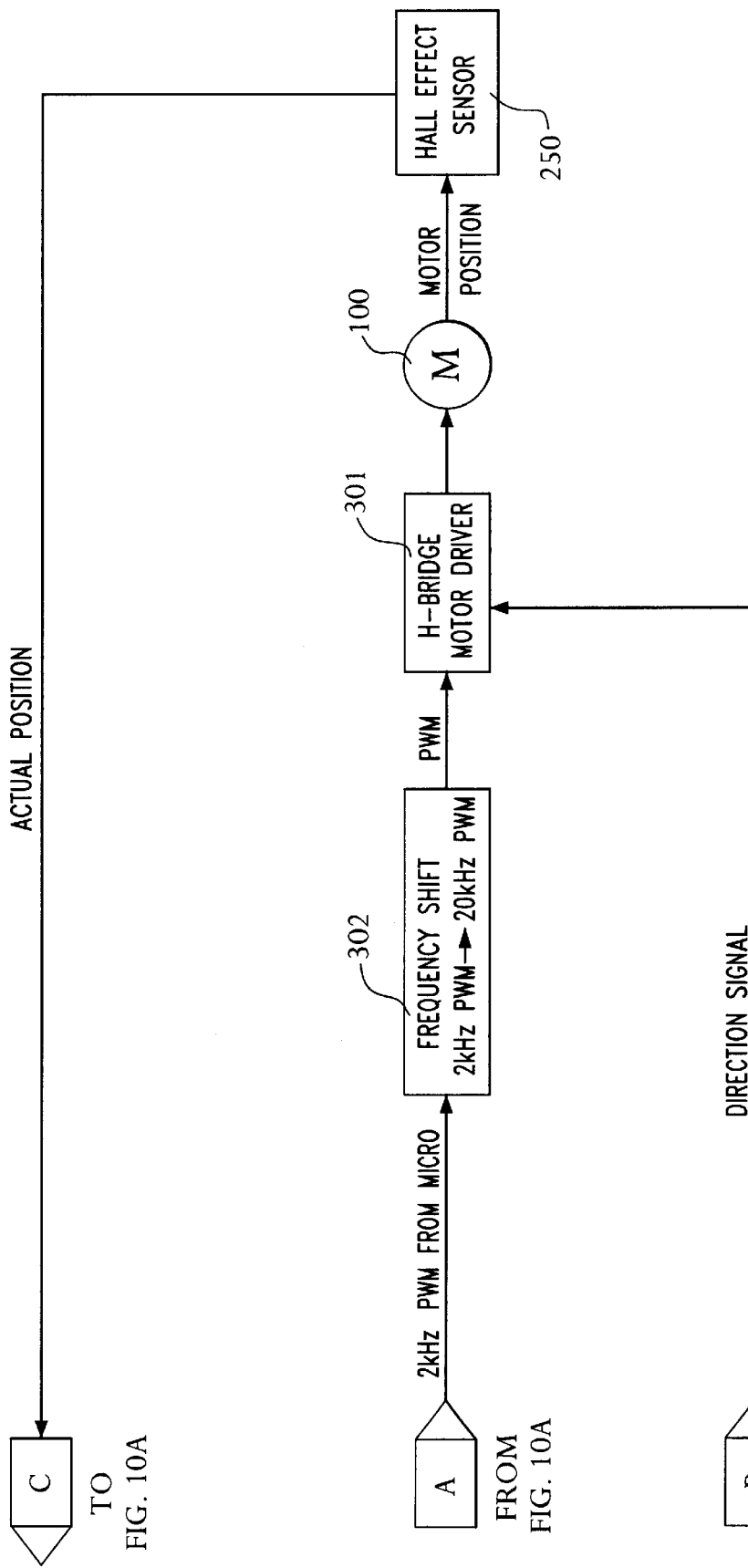

Thus, a motor control circuit is provided which includes a microprocessor and software which are responsible for:
1. driving the motor with a PWM signal that is outside of the audible range;
2. implementing a control loop that minimizes fluctuations in motor speed;
3. operating the motor at a speed where the motor is quiet; and
4. implementing a soft start/stop function Turning now to FIGS. 10A and 10B, there is shown a block diagram of the novel control circuit. Motor 100 is shown in FIG. 10B and its position is monitored by a Hall effect sensor 250 which produces a position signal which is carried back as an input to summing means 300 in FIG. 10A. Motor 100 is driven by the output of an H-bridge circuit 301 which receives a PWM control signal from Frequency Shift circuit 302 FIG. 10B). The bridge circuit 301 produces an output, which is direction selective, based upon the output of direction selection logic block 303 of FIG. 10A.

The desired motor position signal derived from an IR transmitter or wall mounted control is applied at Desired Position block 310 and that position signal and a timer signal from Timer 311 are applied to Control Position Adjustment block 312 (FIG. 10A). The output of block 312 is a Control Position Signal 313 which is an input to sum block 300 which compares the Control Position signal to the signal from Hall sensor 250. Any error is then outputted to Proportional Gain circuit 320, Differentiator 321 and Direction Selection Logic 303. The outputs of circuits 320 and 321 are summed with a Nominal Duty Cycle signal from block 322 in summing block 323 to produce a 2 kHz signal pulse-width modulated by the current duty cycle to Frequency Shift circuit 302.

In general, the control of FIGS. 10A and 10B utilizes a microprocessor to regulate motor speed by implementing a closed-loop position control system. In the steady state, when the motor 100 should be operating at constant speed, the speed is regulated by incrementing or decrementing the input to the position controller at regular intervals. This results in the position of the motor changing at a constant rate (that is, moving at a constant speed). The output of the position control is the motor direction signal, and the 2 KHz PWM signal, which ultimately affect the operation of the H-bridge 301 used to drive the motor 100.

The position controller structure is the heart of the motor control system and allows easy implementation of the "soft" start/stop. Thus, soft start and stop, which reduces motor noise, is implemented simply by controlling the rate at which the input to the position controller changes when the motor is either starting up from 0 RPM or slowing down to 0 RPM. This will be further described in the flow diagrams of FIGS. 11A to 11C.

The motor 100 of FIG. 10B is driven by H-bridge 301 which may be implemented with MOSFETs. The H-bridge 301 is driven with a 20 kHz PWM signal which is generated by a small circuit on the motor control board. The PWM circuit takes as an input the 2 kHz PWM signal from the microprocessor. This 2 kHz signal is converted to a DC voltage by filtering out any components of the 2 kHz PWM signal above approximately 15 Hz. This DC voltage is then compared to a 20 kHz ramp unction using a simple comparator circuit. The output of this comparator circuit is the 20 kHz PWM signal with a duty cycle that follows the duty cycle of the 2 kHz PWM signal.

The novel control loop uses two inputs to generate a PWM signal. The first is the actual motor (roller shade) position, which is determined by sampling the Hall Effect sensor 250 which is integral to the motor. The Hall Effect sensor has a resolution of approximately two degrees of Output Shaft movement, or about 0.050 inch of shade travel. The second input is an internally generated control position, which reflects the ideal position for the shade to be in at any given time. The control loop calculates the error between the actual position and the control position, as shown in FIG. 10A by "Error", and uses a combination of proportional and differential gain from blocks 320 and 321, respectively, as well as a learned value, known as the nominal duty cycle (from block 322 in FIG. 10A) to calculate a PWM duty cycle. The proportional gain is determined by multiplying the error by a predetermined constant. The differential gain is calculated by averaging the change in calculated position error of the last four readings, and multiplying by a predetermined constant. The normal duty cycle (learned value), which is similar to integral feedback, is calculated by making small adjustments to the previous value for normal duty cycle each time the control loop is executed, based on the shade position error as will be later described. Summing the proportional gain, differential gain, and the normal duty cycle at sum 323 in FIG. 10B gives the 2 kHz PWM duty cycle, which the microprocessor outputs to the hardware on the motor control board.

Figure 11A:
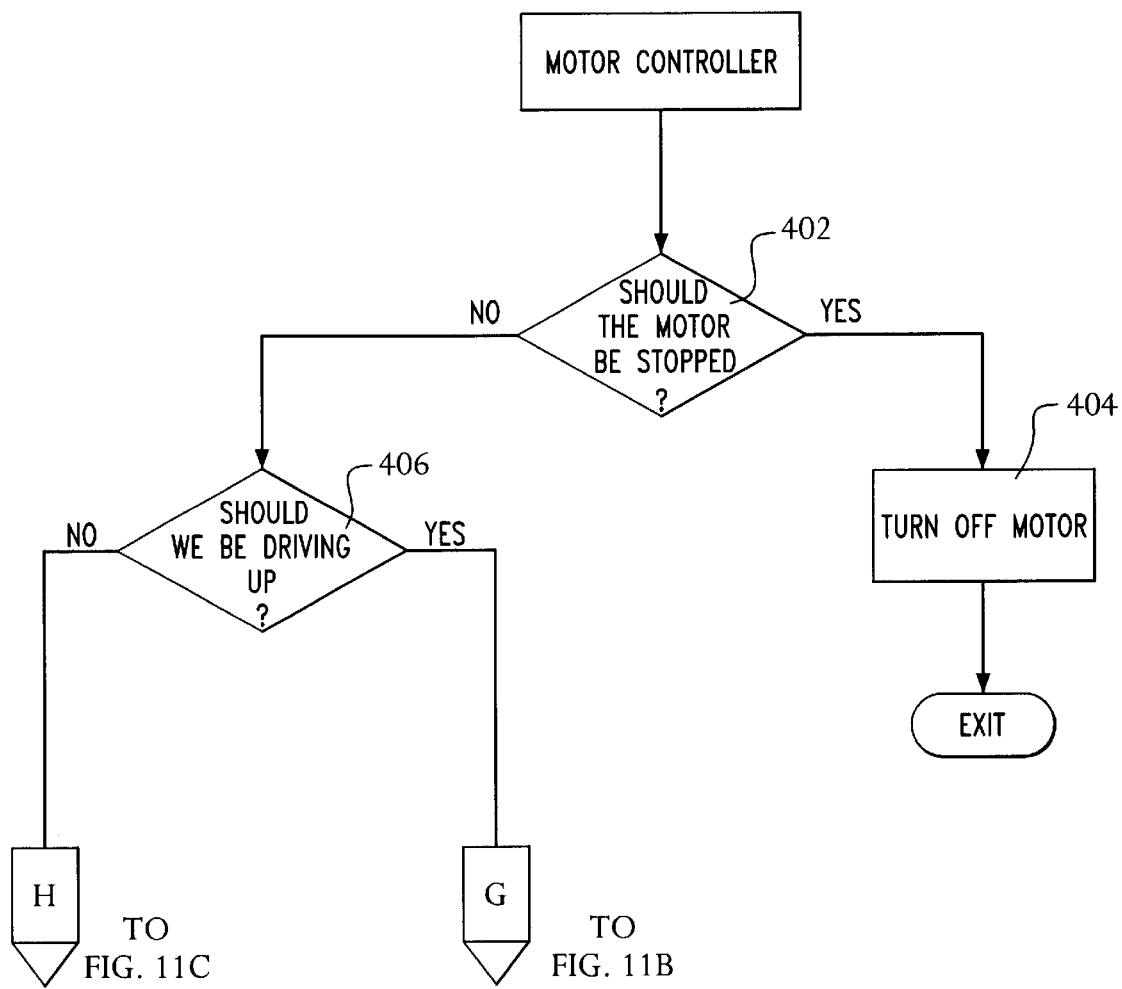
FIGS. 11A to 11B are interrelated sections of a flow diagram of the operation of the controller of FIGS. 10A and 10B for the shade position control and speed control.
Figure 11B:
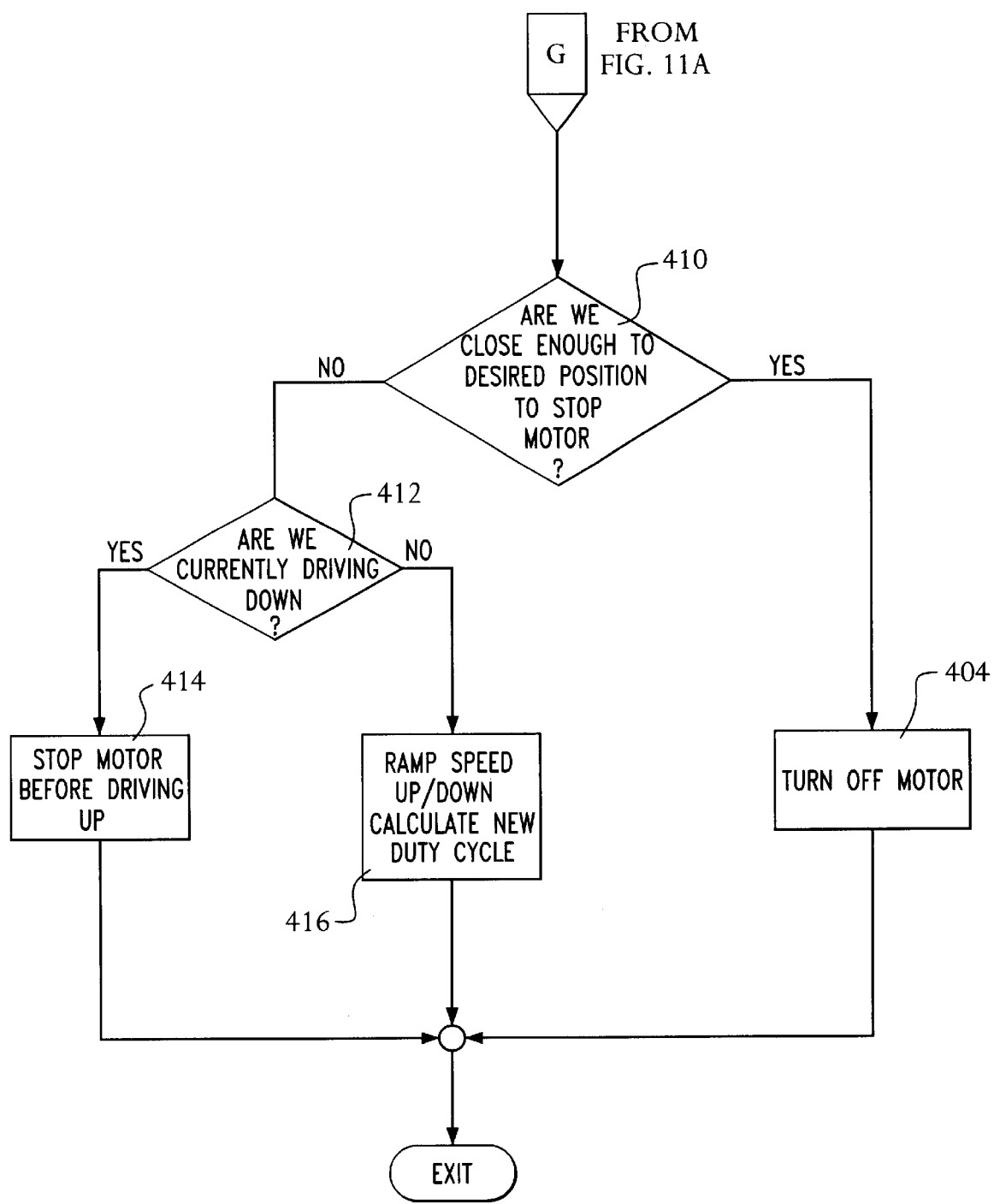
Figure 11C:
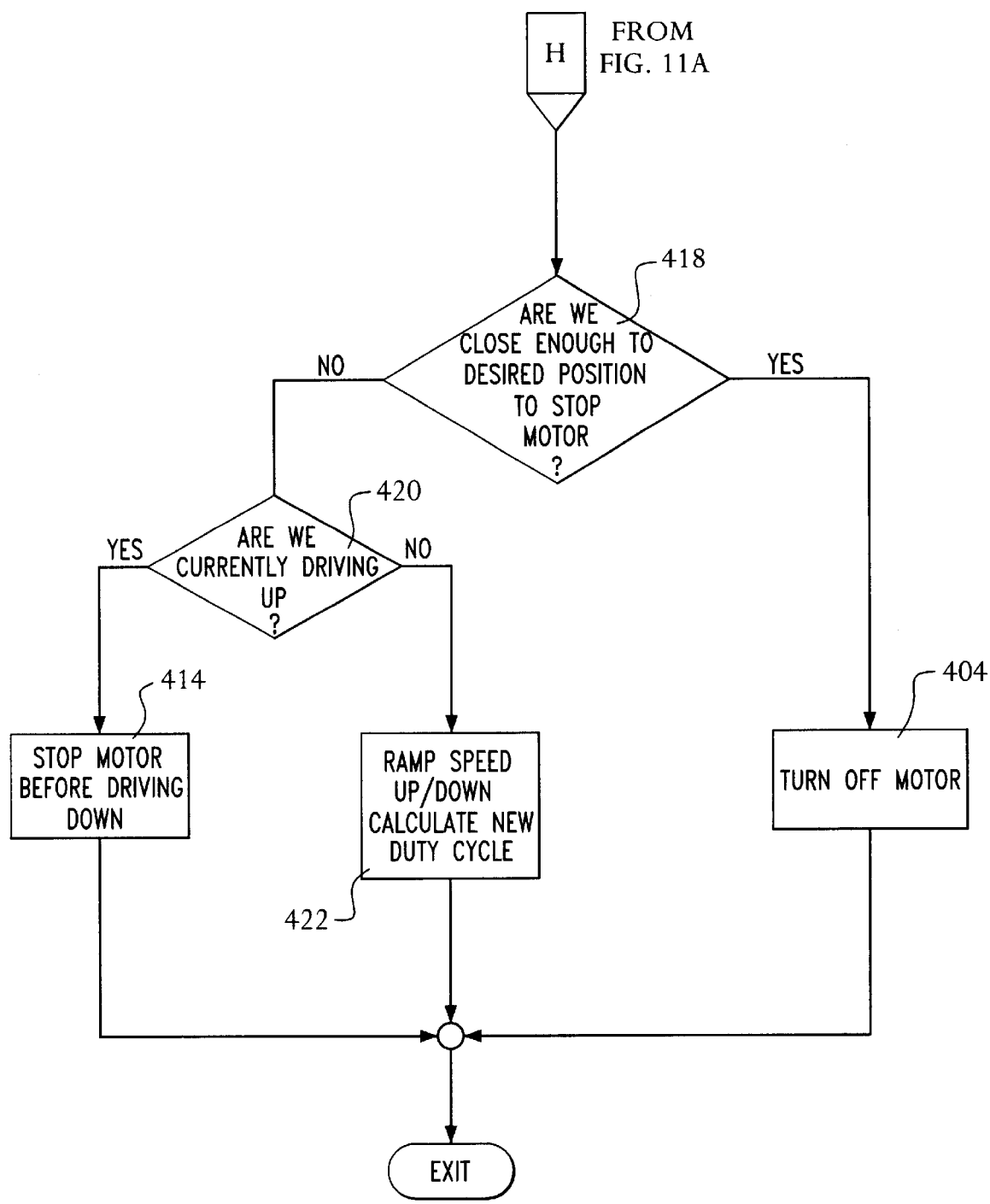

Turning now to FIGS. 11A–11C, there is shown a flow diagram for the software controlling the motor 100. In particular, this flow diagram shows how the 2 kHz duty cycle is determined, as well as the direction in which the motor is to be driven. In block 402 (FIG. 11A), a determination is made as whether the motor must be immediately stopped, such as in the case of a fault condition. If so, the motor is stopped immediately by being deenergized in block 404. (When the motor is stopped during normal operation, it is stopped by slowing it down gradually by reducing the duty cycle.) If not, then the direction in which the shade should be moving, and hence, the direction in which the motor should be turning, is evaluated in block 406. This evaluation is made based upon a user input received from a wall control (not shown) or a handheld infrared remote control (not shown).

If it is determined that the shade should driven upwardly, then a determination is next made in block 410 (FIG. 11B) as to whether the shade is within limits, and outside of the stop tolerance. That is, an evaluation is made to determine whether the motor position (and hence, shade position) is close enough to the desired position, within some margin of error (typically 0.075 inch). If not, then the motor is deenergized in block 404. If yes, then a determination is made in block 412 as to whether the shade is currently moving downwardly. If yes, then the motor must be stopped momentarily before reversing direction and driving the shade upwardly. This is accomplished in block 414 where a Set Control timer is incremented to a maximum value, and the motor is deenergized. If the shade is currently moving upwardly, then the speed of the motor may be ramped up or down in block 416, depending upon whether the motor is soft starting or soft stopping, respectively, or allowed to remain constant (steady-state), depending upon the distance from the desired position. The motor speed ramp is determined by a motor speed ramp function described in FIGS. 13A–13D, while the duty cycle is determined by a duty cycle function described in FIGS. 14A–14D.

If it is determined that the shade should be driven downwardly in block 406, then a determination is made as to whether the shade position is within limits, and outside stop tolerances, in block 418 (FIG. 11C). If not, then the motor is deenergized in block 404. If yes, then a determination is made in block 420 as to whether the motor direction must be reversed. If not, then the motor speed is ramped up or down in block 422, in a manner similar to that for block 416. If the motor direction is to be reversed, then the motor is temporarily stopped in block 414.

Figure 12:
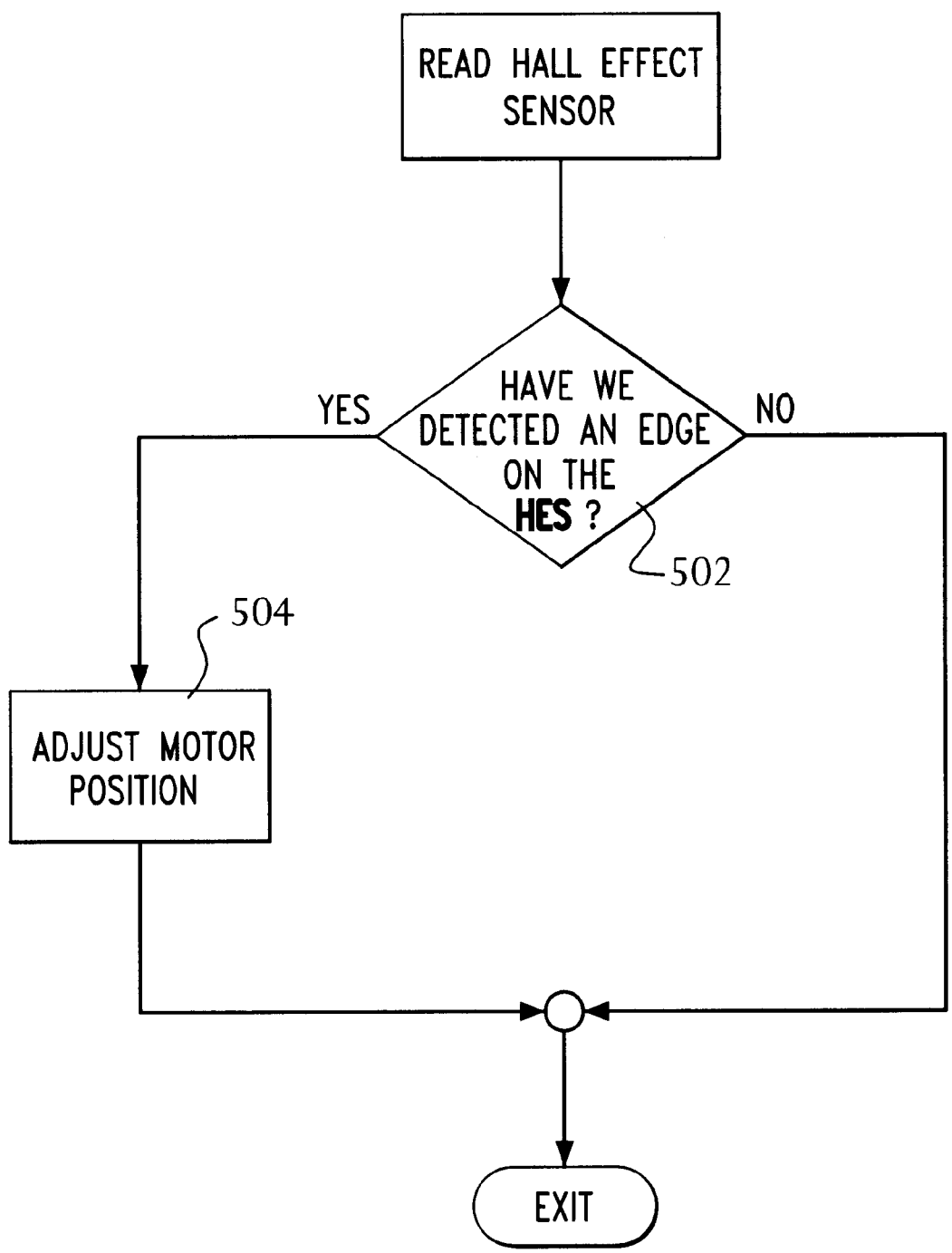
FIG. 12 is a flow diagram of the measurement of shade position by monitoring the rotation of the roller, or the movement of the shade past a Hall effect sensor.

Turning now to FIG. 12, there is shown therein the method of the instant invention for reading the Hall effect sensor 250. This routine is called at regular intervals to sample the sensors. In the currently preferred embodiment of the invention, the sensors are sampled every 572 microseconds. If a change in motor position is detected, a value corresponding to the motor position (stored in the microprocessor random access memory) is adjusted to reflect the current motor position.

A determination is first made in block 502 as to whether an edge has been detected by the Hall effect sensor (HES) 250. If not, then the sample routine exits. If an edge has been detected, then a determination is made in block 504 as to which direction the motor is rotating. If the motor is driving the shade downwardly, then a motor position count is incremented. If the motor is driving the shade upwardly, then the motor position count is decremented.

Turning now to FIGS. 13A–13D, there is shown therein a routine for determining the motor speed ramp function. A determination is first made in block 602 (FIG. 13A) as to whether the motor is currently stopped (that is, motor speed is 0 RPM). If the motor is stopped, then a value, denoted RampPointer, which is used to control the motor speed, is set equal to zero in block 604.

Figure 13A:
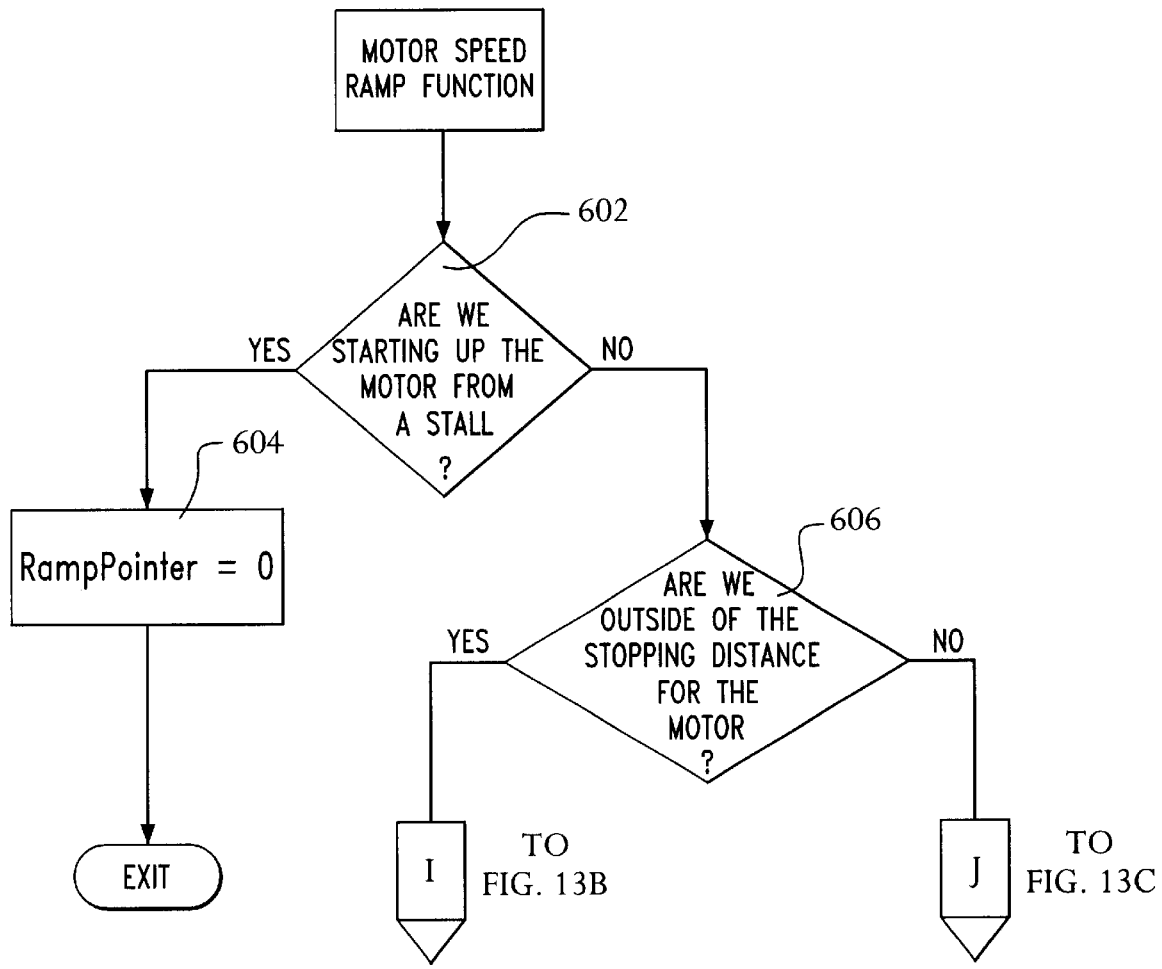
FIGS. 13A to 13D are interrelated sections of a flow diagram of the operation of the controller of FIGS. 10A and 10B for the motor speed ramp control.
Figure 13B:
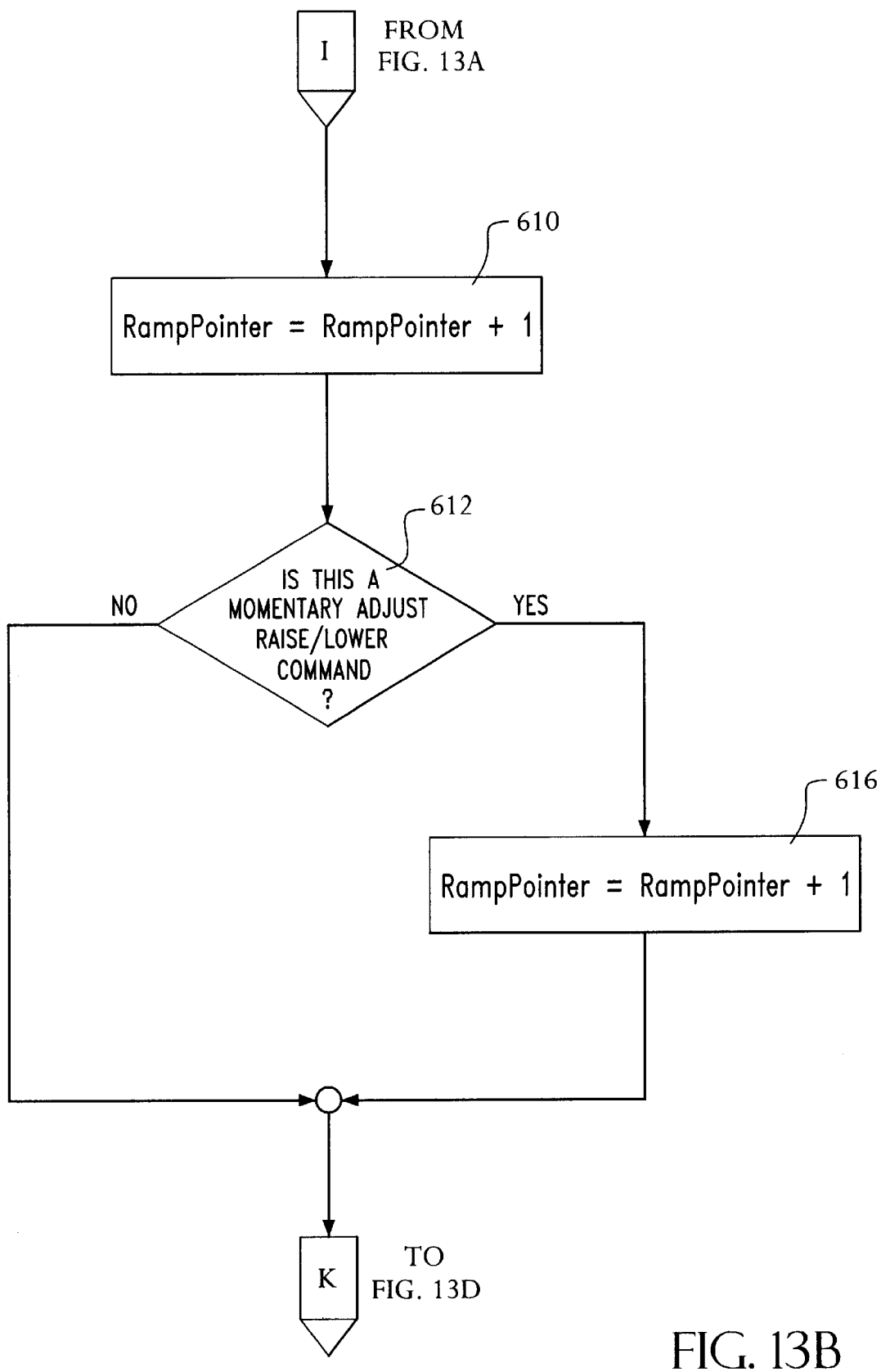
Figure 13C:
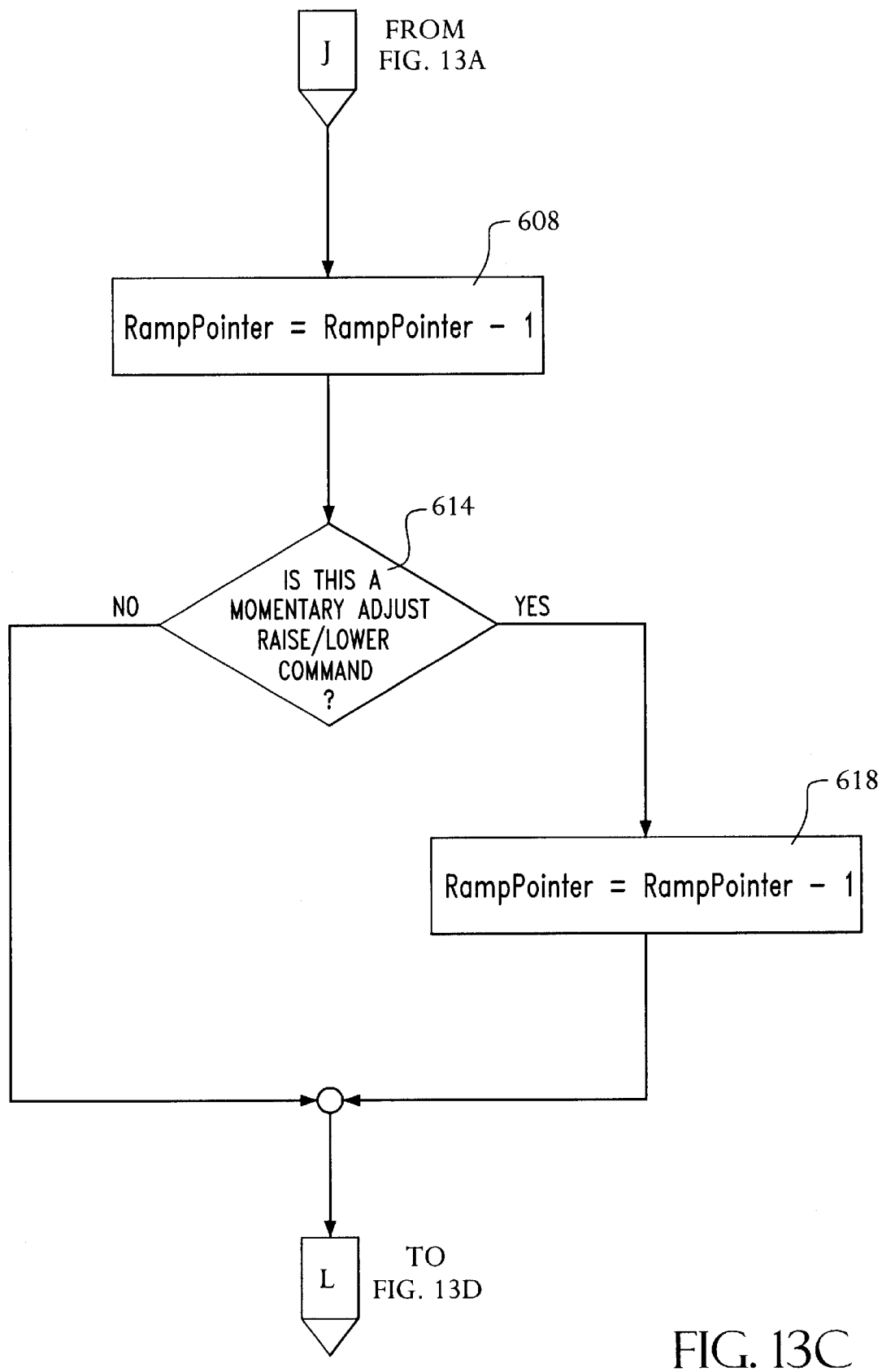
Figure 13D:
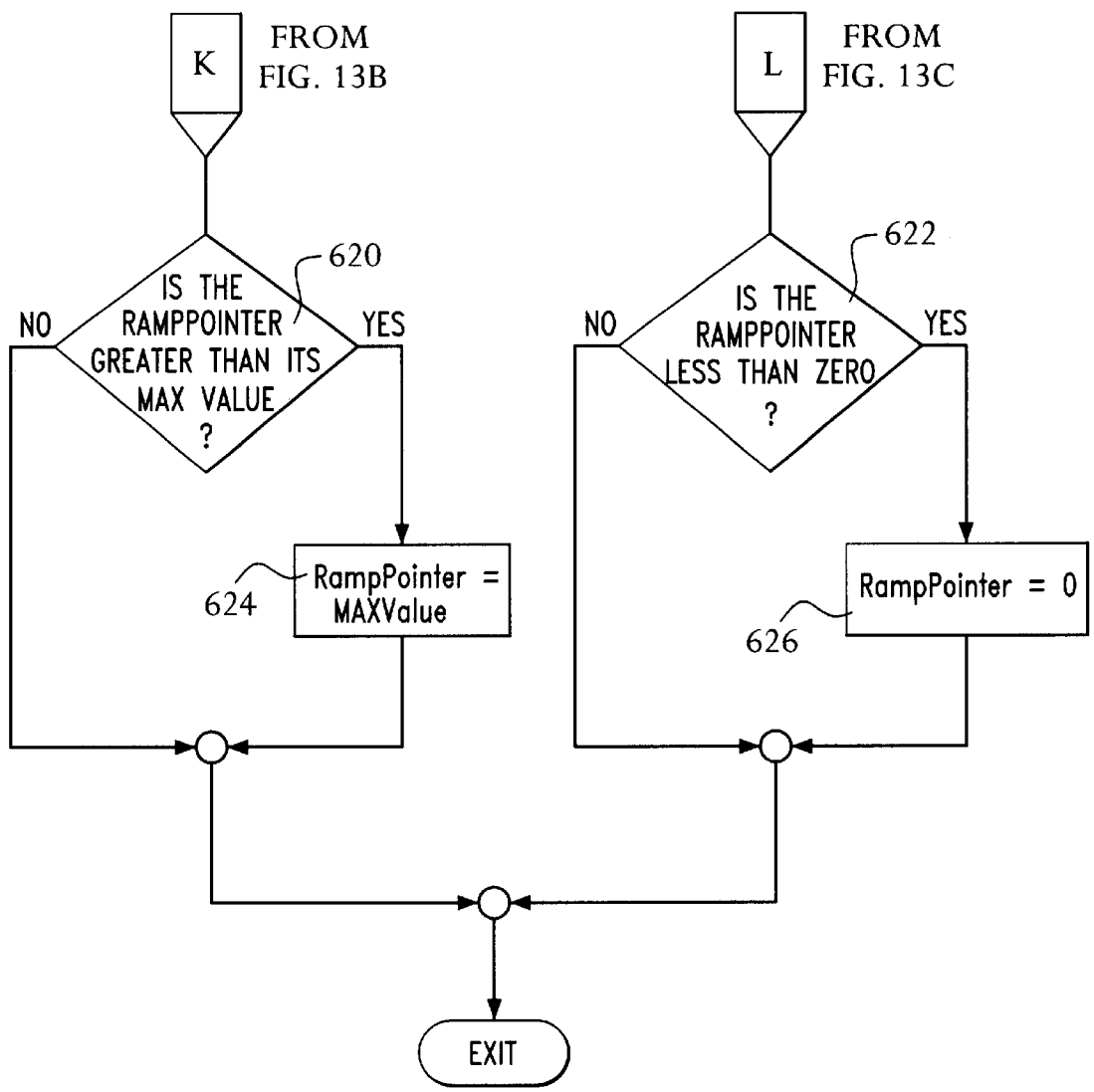

If the motor is not at rest, then a determination must be made in block 606 as to whether the motor is within the "stopping distance". The stopping distance is the distance in which the motor must be slowed as the motor approaches the desired position. If the motor is within the stopping distance (corresponding to a soft stop), then the RampPointer is decremented by one in block 608 (FIG. 13C). If the motor is not within the stopping distance (corresponding to a soft start), then the RampPointer is incremented by one in block 610 (FIG. 13B).

In the event that a user is implementing a momentary adjustment of the shade position, this is determined in blocks 612 (FIG. 13B) and 614 (FIG. 13C). If this is the case, then the RampPointer is again decremented, in block 618 (FIG. 13C), or incremented, in block 616 (FIG. 13B), so as to effect a more rapid response from the motor.

After the ramp speed has been adjusted (by changing the value of the RampPointer), a determination is made as to whether the ramp speed is within predetermined limits. This is accomplished by determining whether the RampPointer is greater than its maximum permissible value in block 620 (FIG. 13D), or whether the RampPointer is less than its minimum permissible value in block 622. If the RampPointer has exceeded its maximum permissible value (that is, the motor has reached its steady-state speed), then it is set to the maximum possible value in block 624. If the RampPointer is less than its minimum permissible value, then the RampPointer is set to the minimum permissible value (in this case, zero) in block 626.

Turning now to FIGS. 14A–14D, the routine for determining the duty cycle of the 2 kHz PWM motor control signal is shown therein. This is accomplished by comparing a control position value with the desired position of the motor. First, a determination is made in block 702 (FIG. 14A) as to whether the shade is moving up and below the desired position. If it is, then the control position is decremented in block 704. If not, then a determination is made in block 706 as to whether the shade is moving down and above the desired position. If it is, then the control position is incremented in block 704.

The next step, in block 710, is to determine whether the motor is stopped. If the motor is stopped, then the stall duty cycle is to be used, and the motor is driven in an open loop configuration. If the motor is not stopped, then the stall duty cycle is not used, and the motor is driven in a closed loop configuration.

For open loop operation, the stall duty cycle is incremented in block 712 (FIG. 14B), and the motor driven with the new stall duty cycle in block 714.

For closed loop operation, the control position is tracked using position feedback. First, the current duty cycle is stored for later use. Then the position error is calculated in block 718 (FIG. 14C), the proportional gain is calculated as five times the error in block 722, and the differential gain is calculated as two times the average change in error from the last four times through the loop in block 724.

Figure 14A:
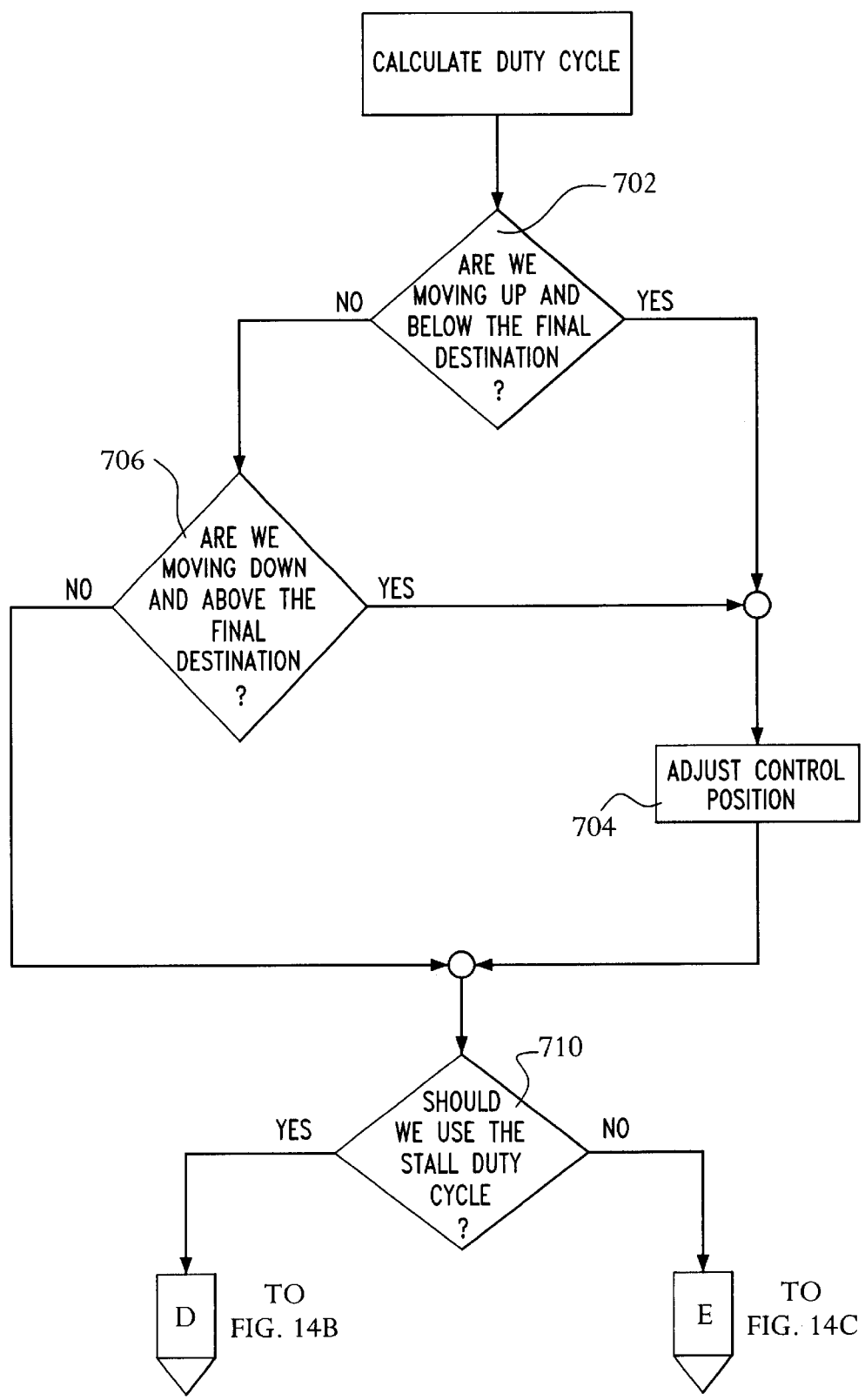
FIGS. 14A to 14D are interrelated sections of a flow diagram of the operation of the controller of FIGS. 10A and 10B for duty cycle control.
Figure 14B:
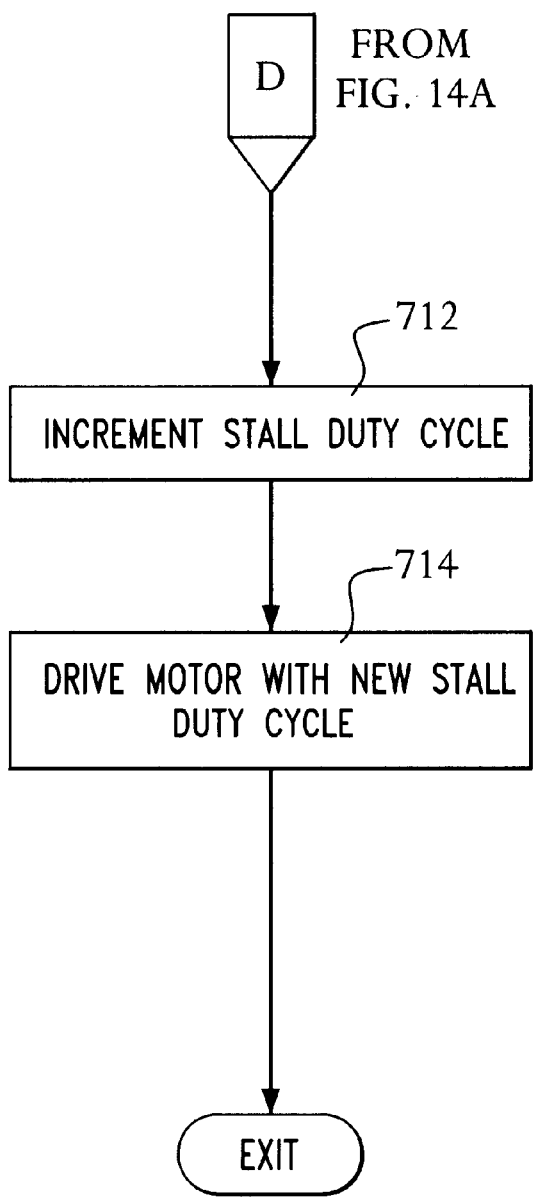
Figure 14C:
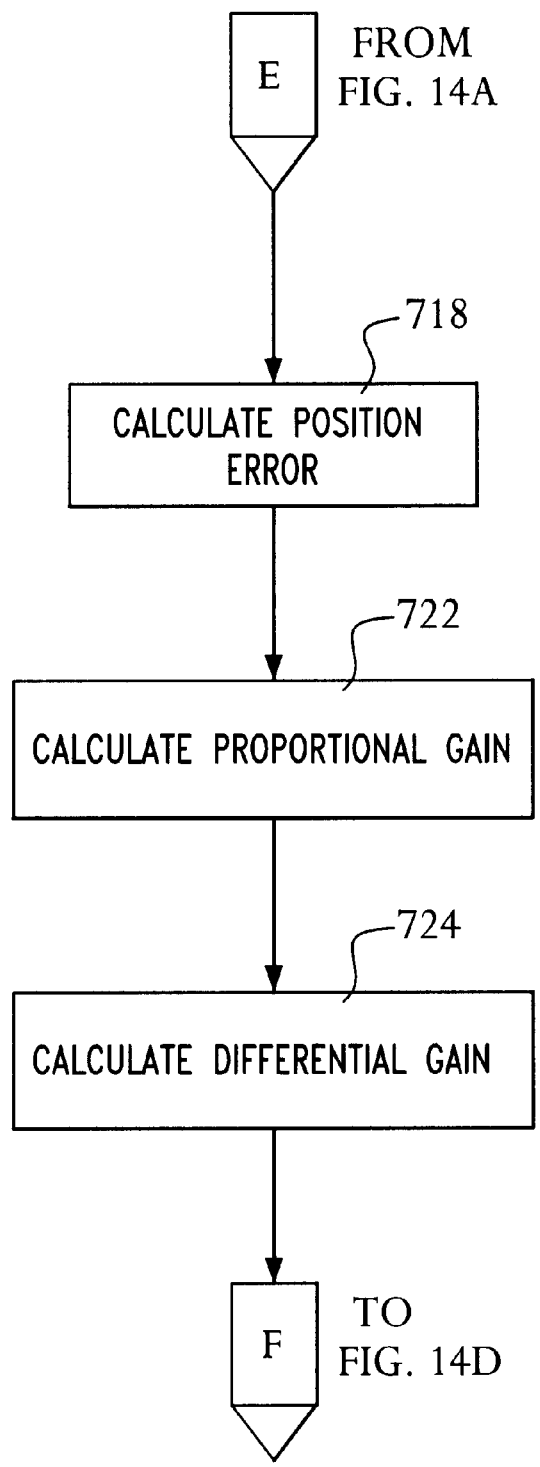
Figure 14D:
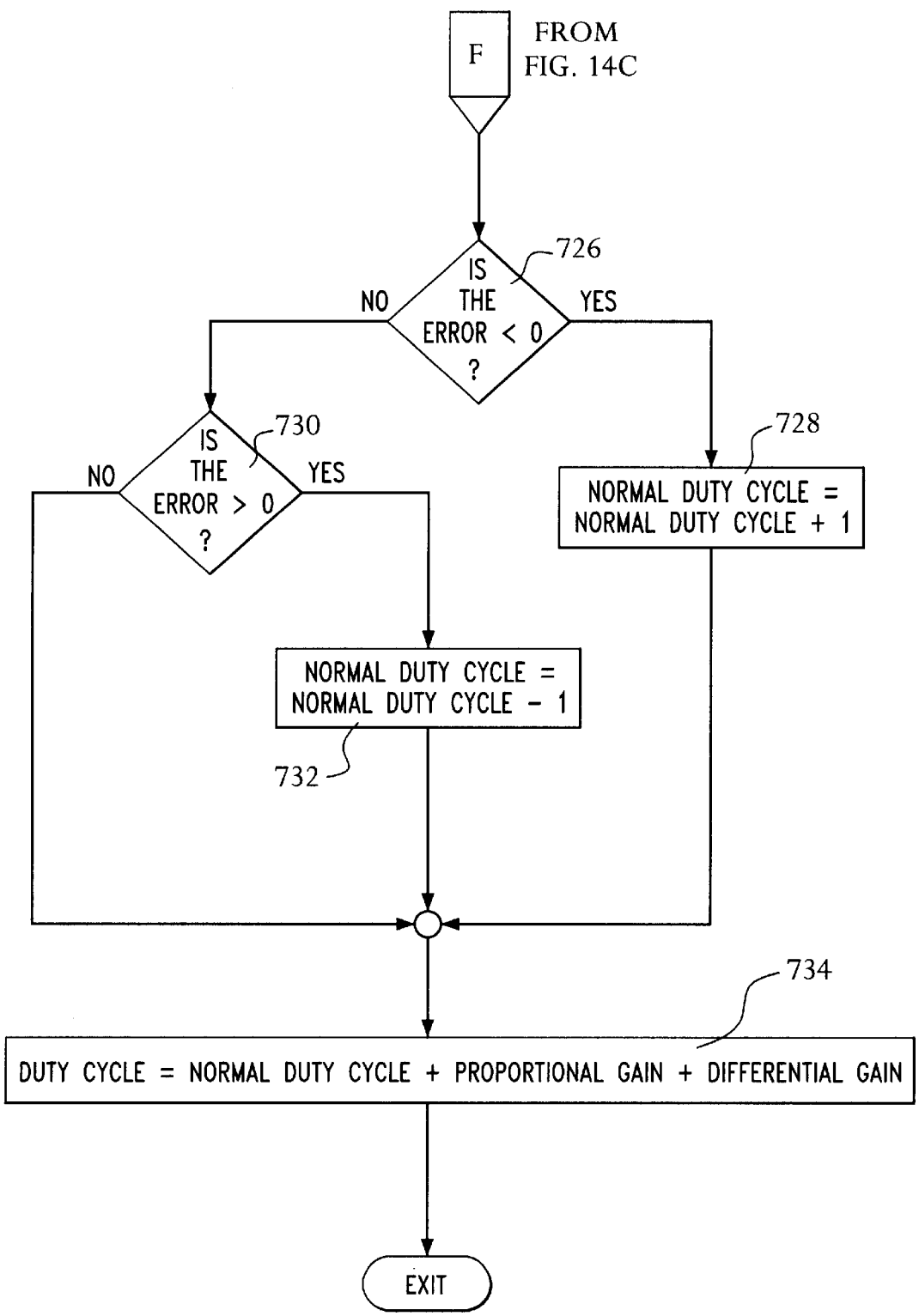

A determination is then made as to whether the error is less than zero in block 726 (FIG. 14D). If the error is less than zero, then a normal or nominal duty cycle is incremented by one in block 728. If the error is not less than zero, then a determination is made as to whether the error is greater than zero in block 730. If the error is greater than zero, then the nominal or normal duty cycle is decremented by one in block 732. If the error is equal to zero, then the normal duty cycle is unchanged. The new duty cycle is then calculated in block 734 as the sum of the normal duty cycle, the proportional gain, and the differential gain.

It will be appreciated by those skilled in the art that other motor speed control means may be employed. For example, analog electrical control circuits may be used. Alternatively, mechanical speed control elements such as governors or clutches may also be used.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A motorized roller shade assembly comprising:

an elongated reelable shade capable of accumulating an electrostatic charge;

an elongated, electrically conductive roller secured to one end of said reelable shade and rotatable about a longitudinal axis for reeling and unreeling said shade;

an electrically non-conductive end cap coupled to a first end of said roller and in coaxial alignment with said longitudinal axis, said end cap defining an opening adapted to receive a drive shaft, said opening in coaxial alignment with said longitudinal axis;

an electric motor assembly having an output drive shaft received within said opening for rotating said roller to reel and to unreel said shade, an electronic motor controller for controlling said motor assembly, and a ground terminal adapted to be coupled to an external electrical ground, said output drive shaft in electrical communication with said ground terminal; and an electrical conductor having a first portion thereof connected to said roller and a second portion thereof received within said opening in electrical communication with said output drive shaft in all angles of rotation thereof, said first and second portions connected by a middle portion, said first and second portions extending in substantially parallel relation to each other and substantially perpendicularly from opposite ends of said middle portion, whereby electrical charge on said roller is coupled to said shaft.

2. The motorized roller shade assembly of claim 1, wherein said motor assembly is mounted at a location removed from the interior of said roller.

3. The motorized roller shade assembly of claim 1, which further includes a control circuit for controlling the energization of said electric motor assembly and the rotation of said roller; said control circuit including a microprocessor, whereby said microprocessor is protected against electrostatic discharge from said shade by said electrical conductor.

4. The motorized roller shade assembly of claim 3 wherein said motor assembly is mounted at a location removed from the interior of said roller.

5. The motorized roller shade assembly of claim 3, wherein said control circuit includes an H-bridge circuit for producing output power for operating said motor assembly, and a pulse-width modulation circuit coupled to said H-bridge circuit, said pulse-width modulation circuit controlled by said microprocessor for controlling the rotation of said motor assembly.

6. The motorized roller shade assembly of claim 3, which further includes a soft start control circuit for controlling the rate of starting and stopping of rotation of said motor assembly to reduce motor noise.

7. The motorized roller shade assembly of claim 3, which further includes a motor speed limiting circuit to limit the rate of rotation of said output drive shaft to no more than a predetermined value to reduce motor noise.

8. The motorized roller shade assembly of claim 5, which further includes a soft start control means for controlling the rate of starting and stopping of rotation of said motor assembly to reduce motor noise.

9. The motorized roller shade assembly of claim 5, which further includes a motor speed limiting circuit to limit the rate of rotation of said output drive shaft to no more than about 30 RPM to reduce motor noise.

10. The motorized roller shade assembly of claim 6, which further includes a motor speed limiting circuit to limit the rate of rotation of said output drive shaft to no more than about 30 RPM to reduce motor noise.

11. The motorized roller shade assembly of claim 3, which further includes first and second housing halves connectable to one another for enclosing said electric motor assembly and said control circuit, said motor shaft extending through said first housing half.

12. The motorized roller shade assembly of claim 5, which further includes first and second housing halves connectable to one another for enclosing said electric motor assembly and said control circuit, said motor shaft extending through said first housing half.

13. The motorized roller shade assembly of claim 11, which further includes acoustic dampers clamped between said motor assembly and the interior surfaces of said first and second housing halves so that said electric motor assembly is supported within said first and second housing halves and motor noise is reduced when said motor assembly is operated.

14. The motorized roller shade assembly of claim 13, wherein said acoustic dampers include a plurality of spaced support cups on opposite surfaces of said electric motor assembly which engage respective pedestals which extend from and are integral with the interior surfaces of said first and second housing halves respectively.

15. The motorized roller shade assembly of claim 5, which further includes:

first and second housing halves connectable to one another for enclosing said electric motor assembly and said control circuit, said output drive shaft extending through said first housing half; and acoustic dampers clamped between said motor assembly and the interior surfaces of said first and second housing halves so that said electric motor assembly is supported within said first and second housing halves and motor assembly noise is reduced when said motor is operated.

16. The motorized roller shade assembly of claim 6, which further includes:

first and second housing halves connectable to one another for enclosing said electric motor assembly and said control circuit, said output drive shaft extending through said first housing half; and acoustic dampers clamped between said motor assembly and the interior surfaces of said first and second housing halves for supporting said electric motor assembly within said first and second housing halves and for reducing motor assembly noise.

17. The motorized roller shade assembly of claim 7, which further includes:

first and second housing halves connectable to one another for enclosing said electric motor assembly and said control circuit, said output drive shaft extending through said first housing half; and acoustic dampers clamped between said motor assembly and the interior surfaces of said first and second housing halves for supporting said electric motor assembly within said first and second housing halves and for reducing motor noise.

18. The motorized roller shade assembly of claim 7, wherein said predetermined value is about 30 RPM.

19. The motorized roller shade assembly of claim 7, wherein said predetermined value is about 22 RPM.

\* \* \* \* \*